US012774088B2

(12) United States Patent
Heafitz

(10) Patent No.: US 12,774,088 B2
(45) Date of Patent: *Oct. 27, 2026

(54) HORIZON DETECTION TO SUPPORT AN AIRCRAFT ON A MISSION IN AN ENVIRONMENT

(71) Applicant: Aurora Flight Sciences Corporation, Manassas, VA (US)

(72) Inventor: Andrew Heafitz, Cambridge, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 76 days.

This patent is subject to a terminal disclaimer.

(21) Appl. No.: 18/919,611

(22) Filed: Oct. 18, 2024

(65) Prior Publication Data

US 2025/0042545 A1 Feb. 6, 2025

Related U.S. Application Data

(63) Continuation of application No. 17/455,607, filed on Nov. 18, 2021, now Pat. No. 12,122,511.

(51) Int. Cl.
*B64C 39/02* (2023.01)
*G06T 7/12* (2017.01)
(Continued)

(52) U.S. Cl.
CPC .............. *B64C 39/024* (2013.01); *G06T 7/12* (2017.01); *G06T 7/13* (2017.01); *G06T 7/174* (2017.01);
(Continued)

(58) Field of Classification Search
CPC ........... B64C 39/024; G06T 7/12; G06T 7/13; G06T 7/174; G06V 10/60; G06V 10/26; B64U 2201/10; B64U 2101/30
See application file for complete search history.

(56) References Cited

U.S. PATENT DOCUMENTS 5,988,862 A * 11/1999 Kacyra ................ G01C 15/002 702/155
6,933,965 B2 8/2005 Heafitz
(Continued)

OTHER PUBLICATIONS

A. Torralba and A Oliva; "Depth estimation from image structure" in IEEE Transactions on Pattern Analysis and Machine Intelligence; vol. 24, No. 9; pp. 1226-1238; Sep. 2002; doi: 10.1109/TPAMI.2002.1033214. (Year: 2002).
(Continued)

*Primary Examiner* — Gertrude Arthur Jeanglaude
(74) *Attorney, Agent, or Firm* — Harrity & Harrity, LLP

(57) ABSTRACT

A method is provided for horizon detection. The method includes acquiring an image that depicts a view of an environment, and defining a line pattern of lines that divide the image into respective pairs of image segments. The line pattern is formed of lines that are parallel, or intersecting at a common point of intersection. The method incudes searching the lines of the line pattern to identify one of the lines as an estimated true horizon in the image that divides the image into a respective pair of image segments at a boundary of greatest difference in average brightness between the image segments from among the respective pairs of image segments. The method includes determining true horizon in the image from the estimated true horizon. The method may also include an evaluation of the estimated true horizon or the true horizon as to verify one or more expected characteristics.

20 Claims, 17 Drawing Sheets

(51) Int. Cl.
*G06T 7/13* (2017.01)
*G06T 7/174* (2017.01)
*G06V 10/26* (2022.01)
*G06V 10/60* (2022.01)
*B64U 101/30* (2023.01)

(52) U.S. Cl.
CPC .............. *G06V 10/26* (2022.01); *G06V 10/60* (2022.01); *B64U 2101/30* (2023.01); *B64U 2201/10* (2023.01)

(56) References Cited

U.S. PATENT DOCUMENTS

| | | | | |
|---|---|---|---|---|
| 10,055,648 | B1 | 8/2018 | Grigsby et al. | |
| 11,580,690 | B1 | 2/2023 | Head et al. | |
| 2008/0009966 | A1 * | 1/2008 | Bruemmer ........... | G05D 1/0274 700/245 |
| 2012/0269388 | A1 | 10/2012 | Jiang et al. | |
| 2015/0195496 | A1 | 7/2015 | Hayakawa et al. | |
| 2023/0125312 | A1 | 4/2023 | De Zarraga et al. | |

OTHER PUBLICATIONS

Jeong, Chi Yoon et al.; "Fast horizon detection in maritime images using region-of-interest"; International Journal of Distributed Sensor Networks; 2018; 11 pages; vol. 14, No. 7.

Crisman, Donald M. et al.; "Horizon Detection in the Visible Spectrum"; Thesis, Naval Postgraduate School; Monterey, California; Sep. 2016; 73 pages.

* cited by examiner

HORIZON DETECTION TO SUPPORT AN AIRCRAFT ON A MISSION IN AN ENVIRONMENT

CROSS-REFERENCE TO RELATED APPLICATIONS

This application is a continuation of U.S. patent application Ser. No. 17/455,607, filed on Nov. 18, 2021, which is hereby incorporated by reference in its entirety.

TECHNOLOGICAL FIELD

The present disclosure relates generally to robotics and, in particular, to one or more of the design, construction, operation or use of autonomous robots such as autonomous or semi-autonomous vehicles.

BACKGROUND

Many modern robots and other machines are designed to operate with increased autonomy and are less reliant on well-trained operators to safely operate. Some of these modern robots are manned while others are unmanned. In particular, a variety of unmanned vehicles include unmanned ground vehicles (UGVs), unmanned aerial vehicles (UAVs), unmanned surface vehicles (USVs), unmanned underwater vehicles (UUVs), unmanned spacecraft and the like. The use of unmanned vehicles has grown in recent years and these unmanned vehicles are employed in a wide variety of applications, including both military and civilian uses.

One focus in the field of robotics is in the improvement of autonomy, which often includes multiple aspects of robot operation. These aspects of robot operation include automatic control of a given robot to support remote human control. Another aspect is optimization systems (and associated methods) to determine how, for a given robot or set of robots, tasks should be ordered and/or allocated. And yet another aspect of robot operation is automatic, real-time or near real-time data processing, and exploitation in support of automatic route planning, mission execution and other activities.

Despite advancements, existing autonomy systems are typically configured to address only one aspect of these activities, thereby focusing its design of the underling autonomy algorithms and software architecture on a narrow mission set. This limits the extensibility of existing autonomy systems. Furthermore, it is generally desirable to improve existing systems to enhance their efficiency and operation.

It would therefore be desirable to have a system and method that takes into account at least some of the issues discussed above, as well as other possible issues.

BRIEF SUMMARY

In many situations, operation of a robot such as a UAV or other aircraft may benefit from a situational awareness in which an awareness of true horizon in the environment is detected. Example implementations of the present disclosure therefore provide systems and methods for horizon detection. Some example implementations may include selection of a line or line segment that separates the ground/sky in an image based on relative brightness. This line/line segment may be refined and then evaluated against a number of characteristics that are typical of horizon lines to assign a probability that the proposed line is valid. In this regard, the characteristics may be compared to reference values, tolerances or the like, which may be determined from test images. Each of the characteristics may reflect a probability of a valid true horizon and a total confidence may be indicated over the characteristics.

The present disclosure thus includes, without limitation, the following example implementations.

Some example implementations provide an apparatus for horizon detection, the apparatus comprising: a memory configured to store computer-readable program code; and processing circuitry configured to access the memory, and execute the computer-readable program code to cause the apparatus to at least: acquire an image that depicts a view of an environment; define a line pattern of lines that divide the image into respective pairs of image segments; search the lines of the line pattern to identify one of the lines as an estimated true horizon in the image that divides the image into a respective pair of image segments at a boundary of greatest difference in average brightness between the image segments from among the respective pairs of image segments; and determine true horizon in the image from the estimated true horizon.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

Figure 3:
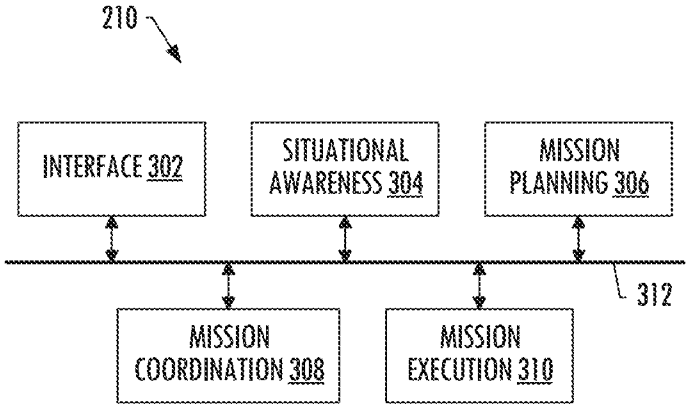
Figure 4A:
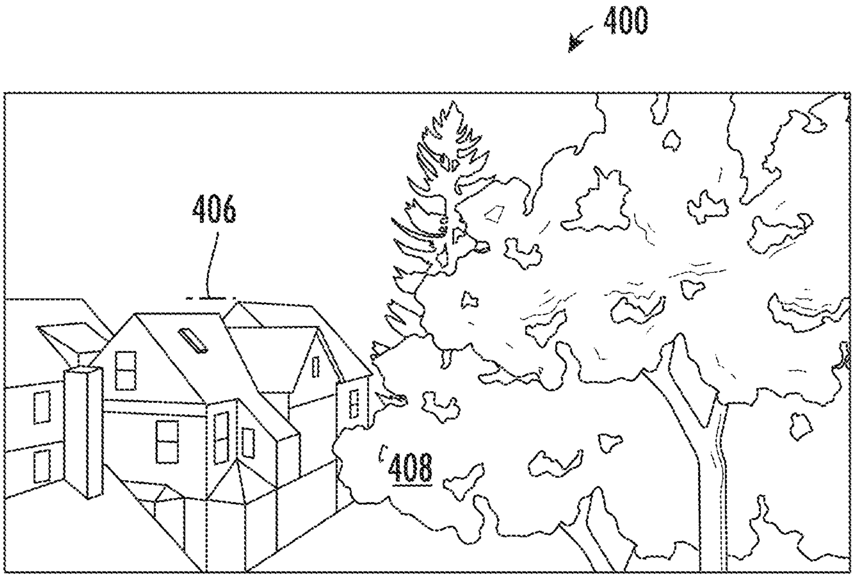
Figure 4B:
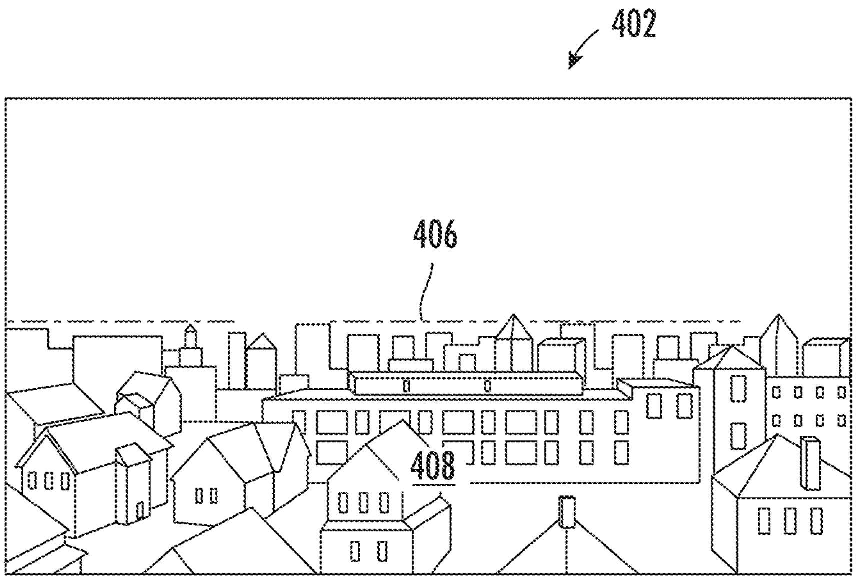
Figure 4C:
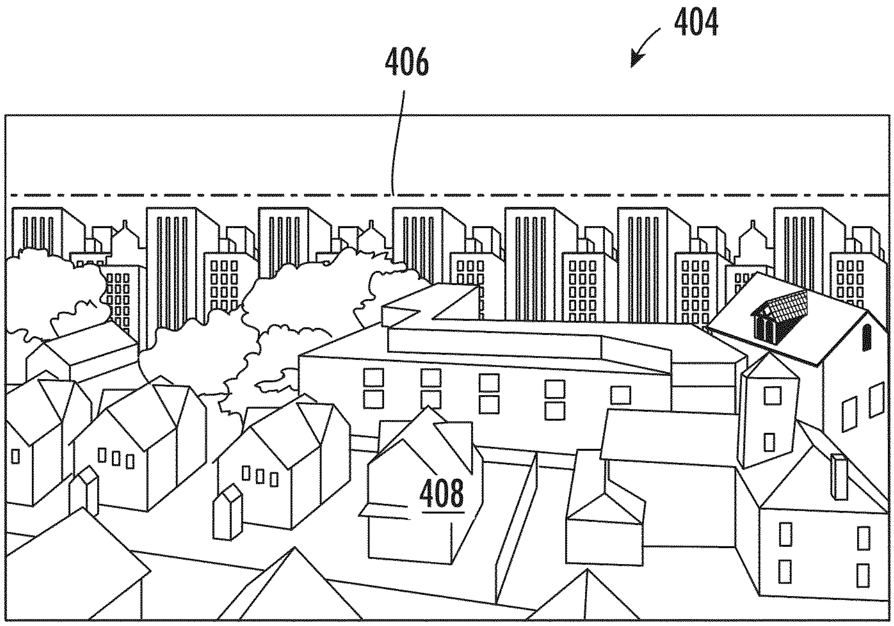
Figure 5:
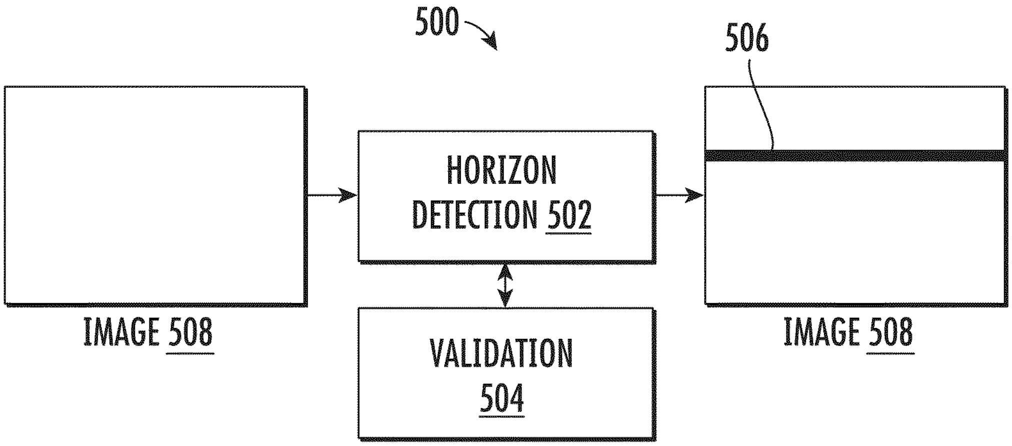
Figure 6A:
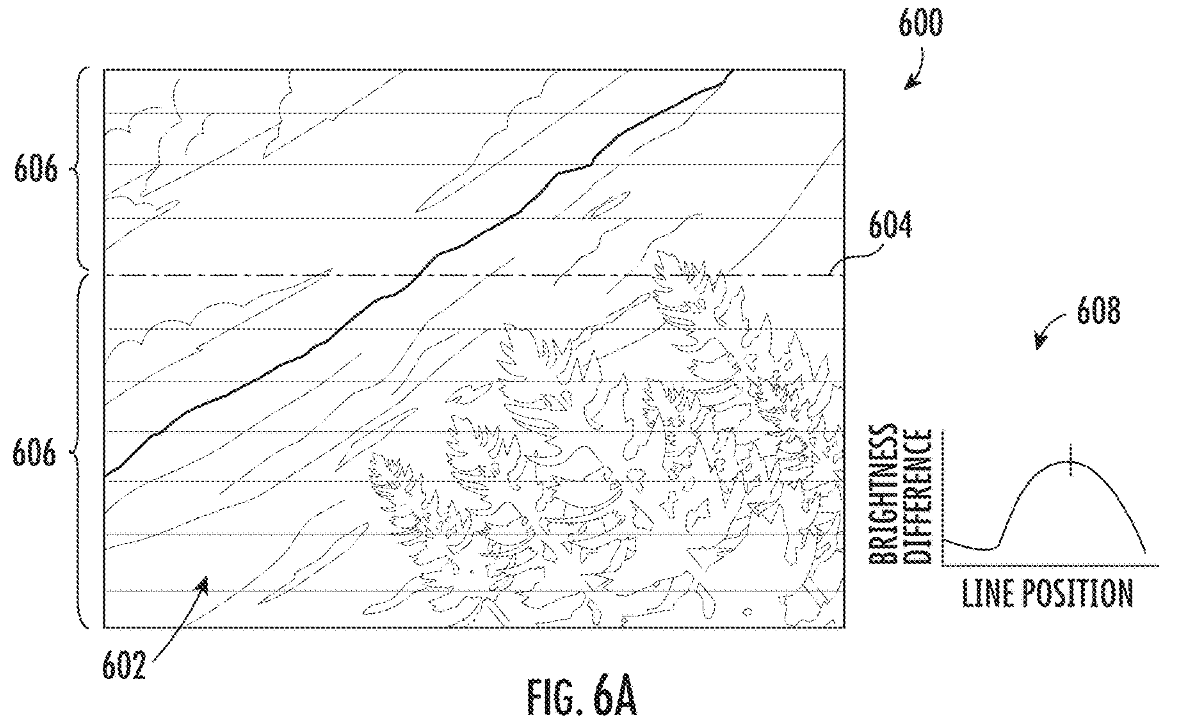
Figure 6B:
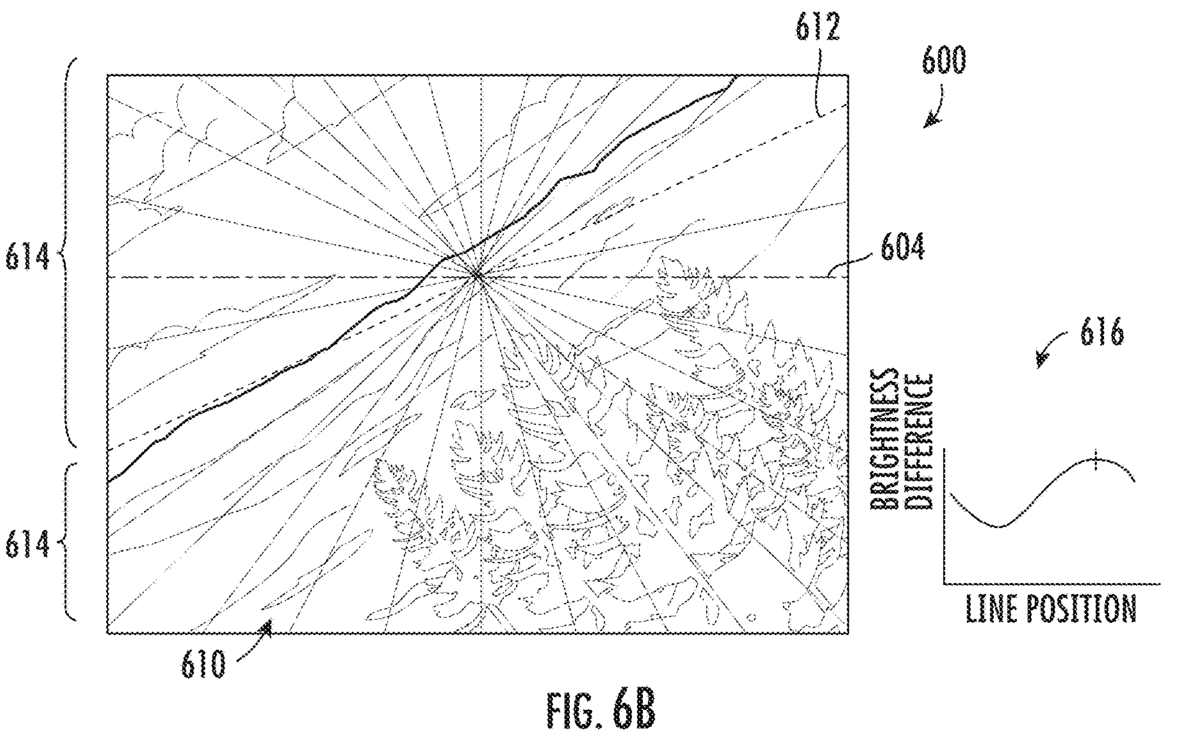
Figure 6C:
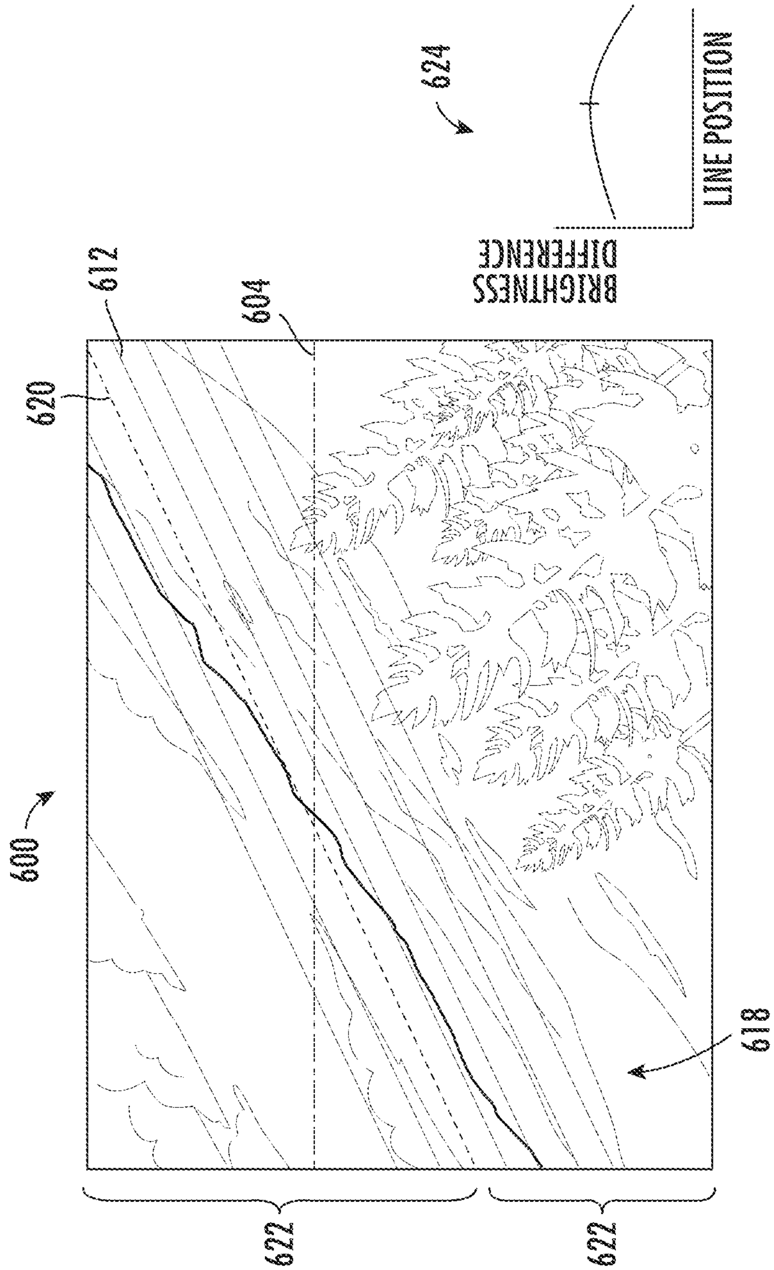
Figure 7A:
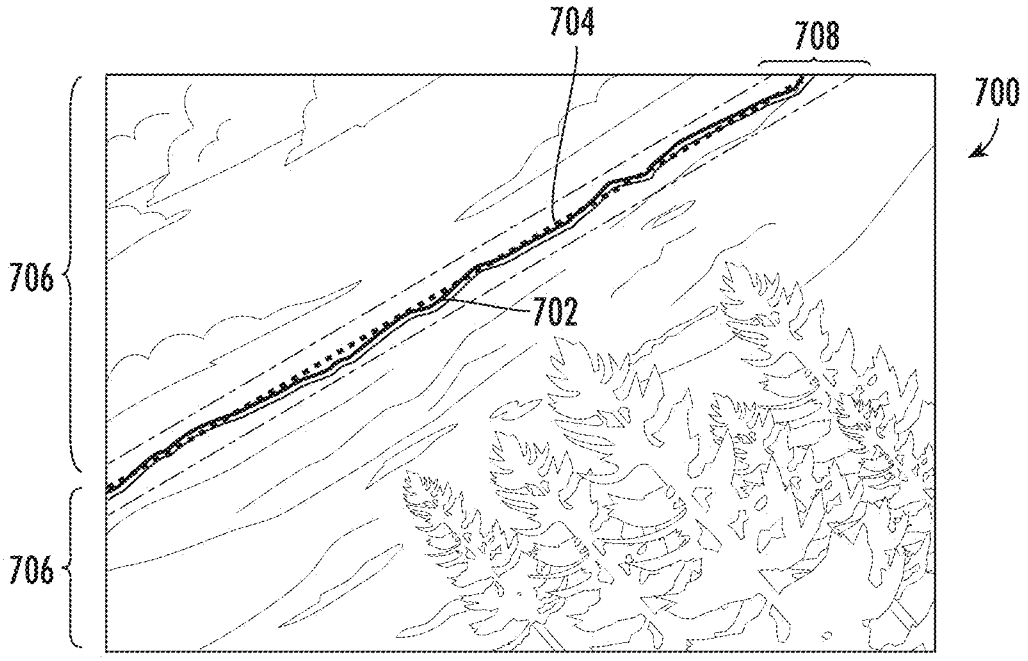
Figure 7B:
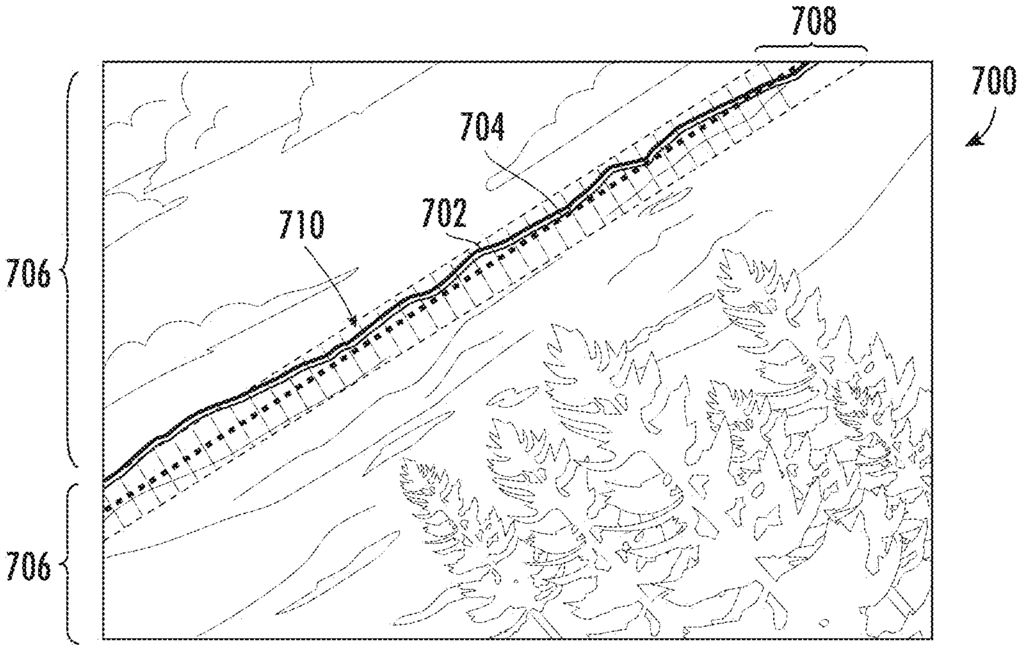
Figure 8:
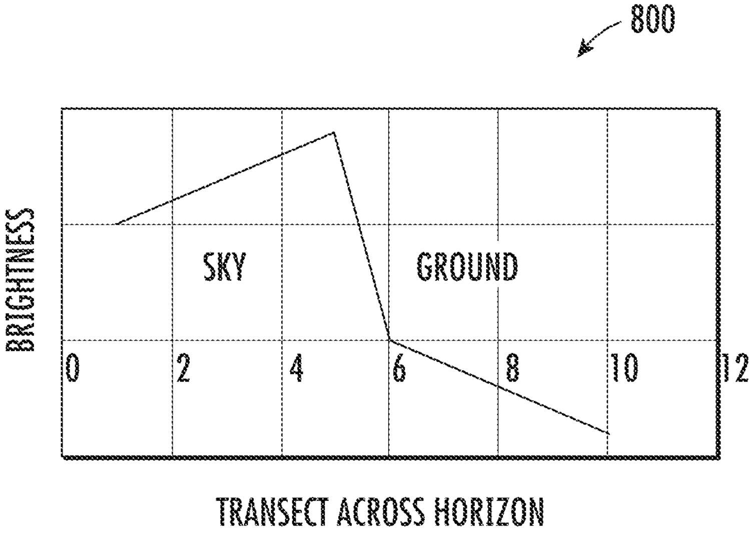
Figure 9:
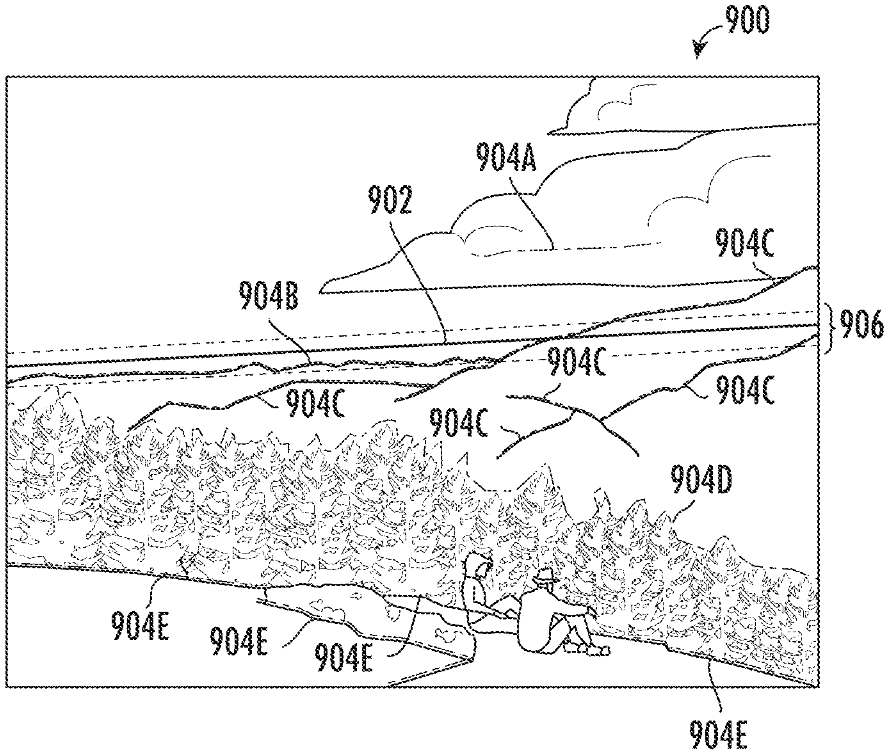
Figure 11A:
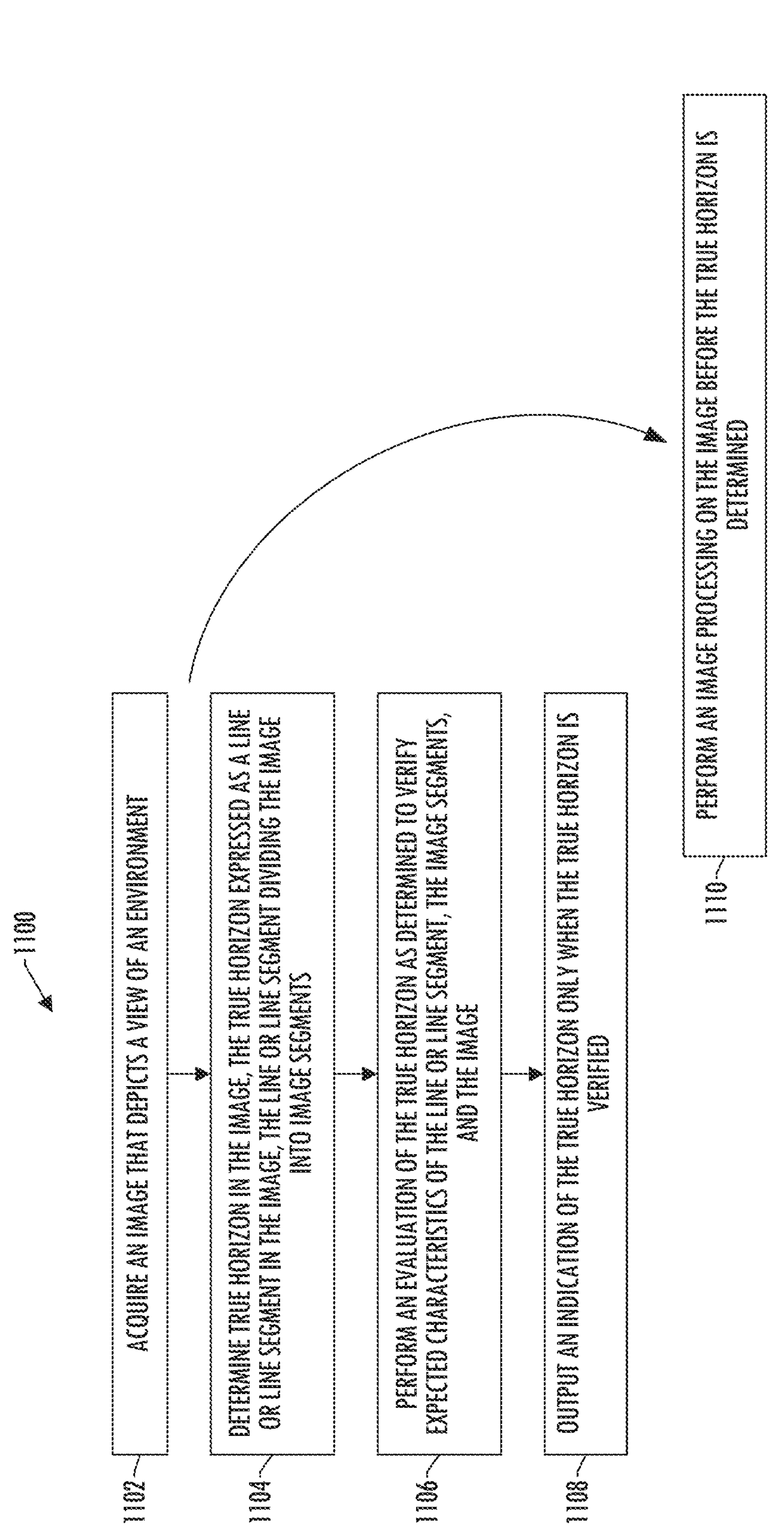
Figure 11B:
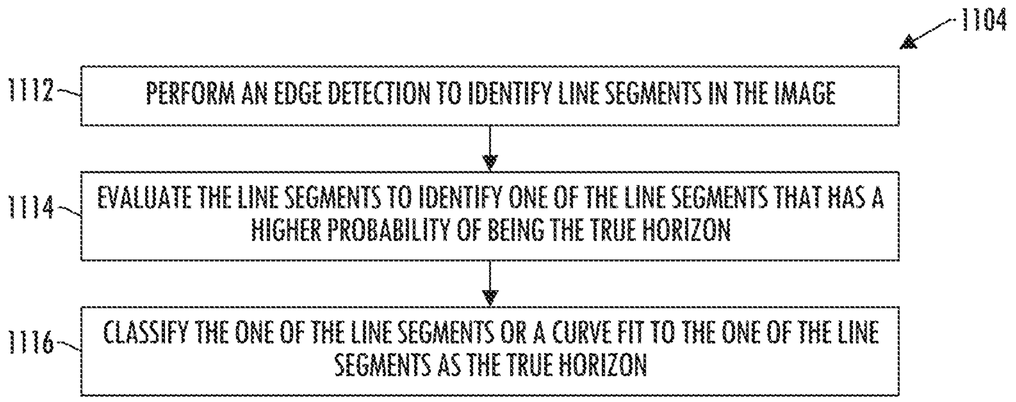
Figure 11C:
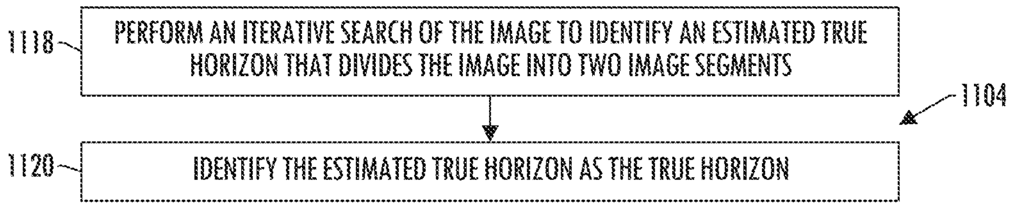
Figure 11D:
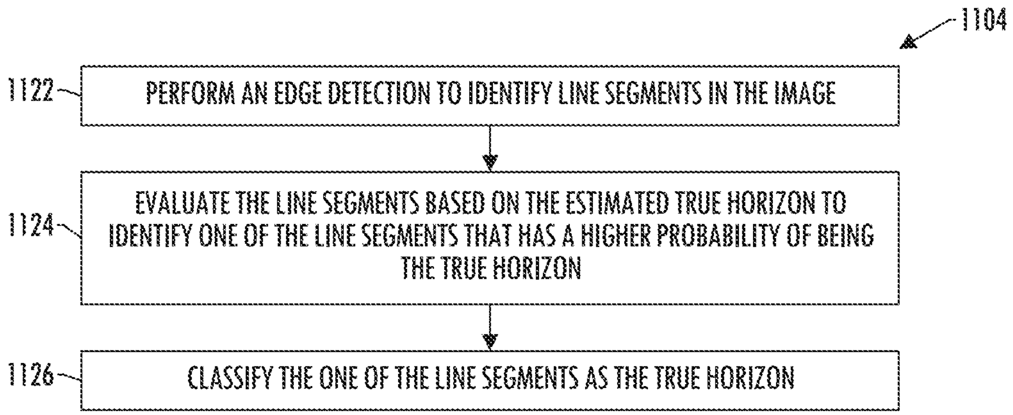
Figure 11E:
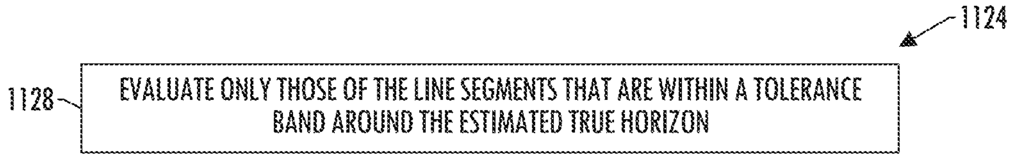
Figure 11F:
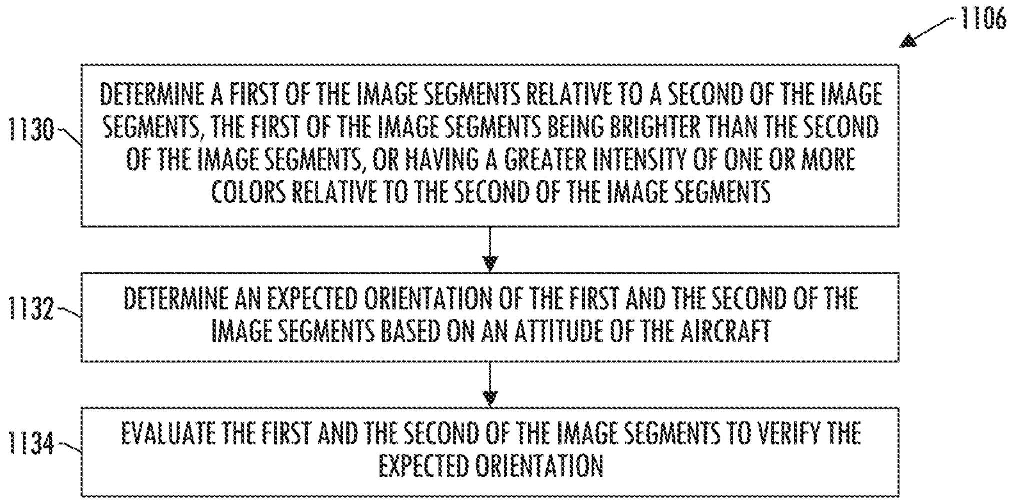
Figure 11G:
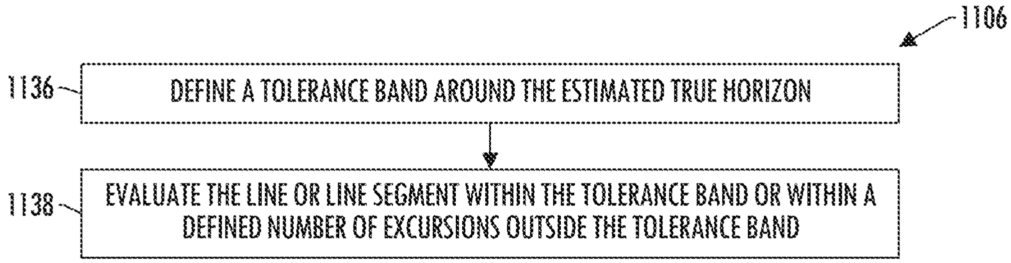
Figure 11H:
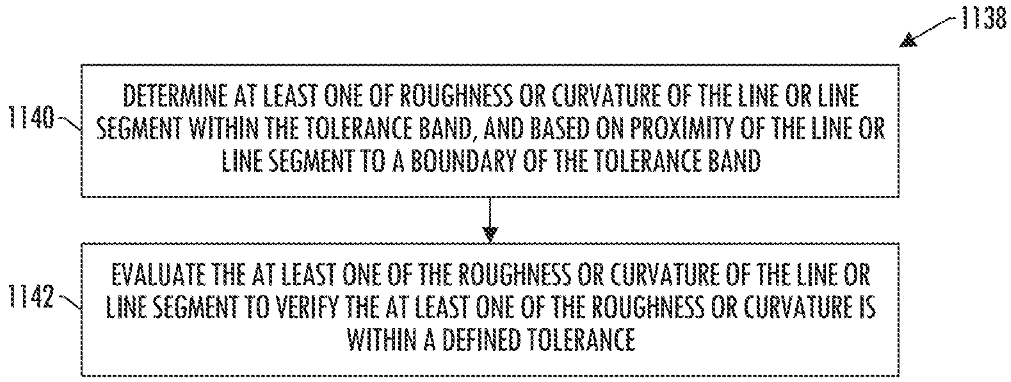
Figure 11I:
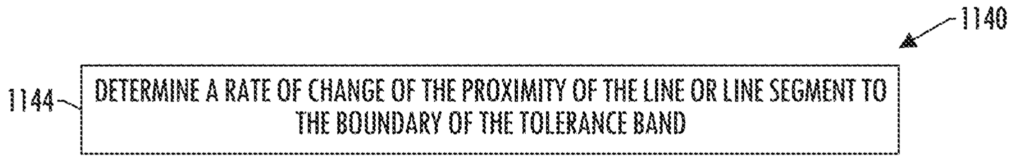
Figure 11J:
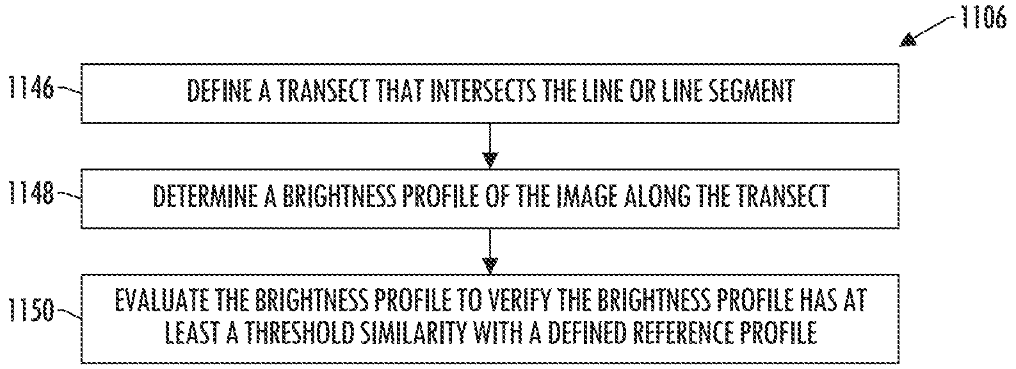
Figure 11K:
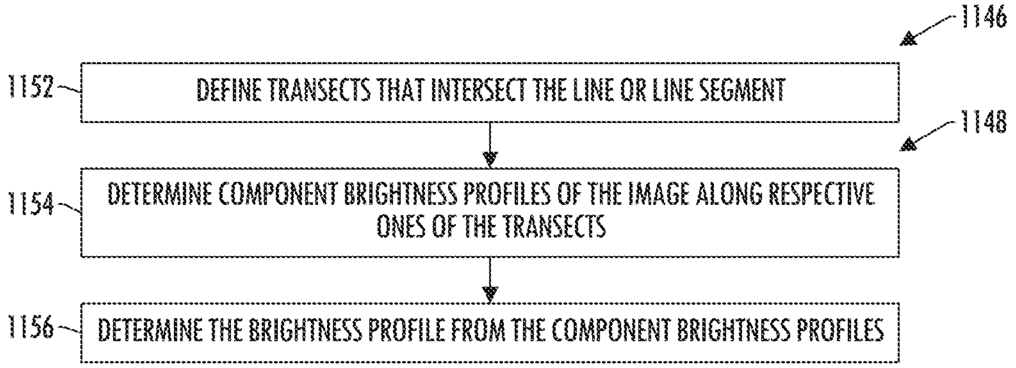
Figure 12:
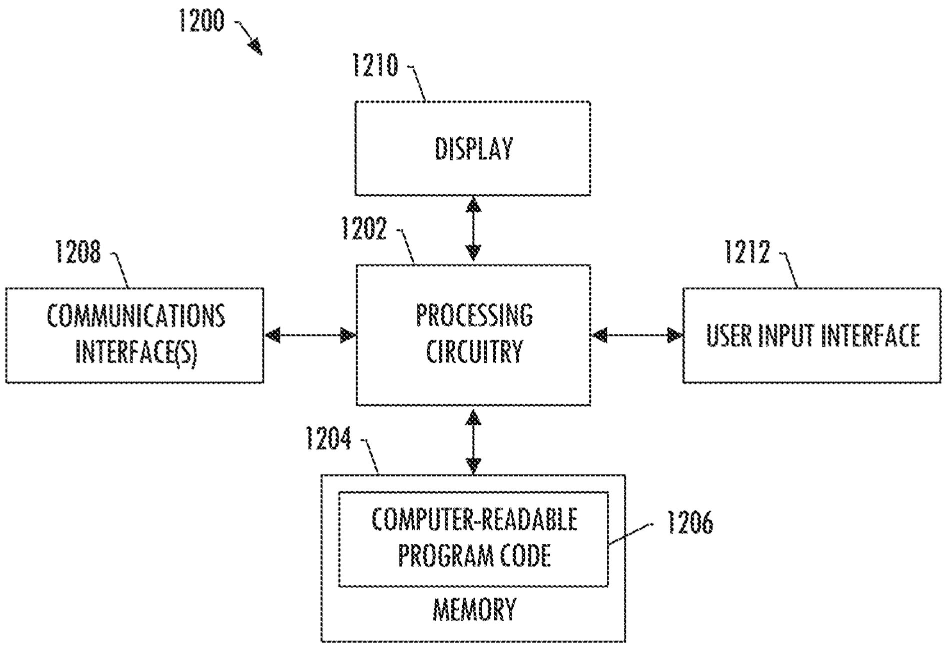

FIG. 3 more illustrates a mission management system (MMS) according to some example implementations;

FIGS. 4A, 4B and 4C illustrate images of views of an environment acquired at different altitudes, according to some example implementations;

FIG. 5 is a diagram of services that may be implemented by a situational awareness subsystem to support an aircraft on a mission, according to some example implementations;

FIGS. 6A, 6B and 6C illustrate an image for which a horizon detection service may perform an iterative search to identify an estimated true horizon, according to some example implementations;

FIGS. 7A and 7B illustrate an image in which a true horizon is determined from an estimated true horizon, and that may be evaluated by validation service, according to some example implementations;

FIG. 8 illustrates a brightness profile, according to some example implementations;

FIG. 9 illustrates an image in which an estimated true horizon is determined, and for which an edge detection is performed to identify line segments in the image, according to various example implementations;

FIGS. 10A, 10B, 10C, 10D, 10E and 10F are flowcharts illustrating various steps in a method of horizon detection, according to various example implementations;

FIGS. 11A, 11B, 11C, 11D, 11E, 11F, 11G, 11H, 11I, 11J and 11K are flowcharts illustrating various steps in another method of horizon detection, according to various example implementations; and FIG. 12 illustrates an apparatus according to some example implementations.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure relate generally to robotics and, in particular, to one or more of the design, construction, operation or use of robots. As used herein, a robot is a machine designed and configurable to execute maneuvers in its environment. The robot may be manned or unmanned. The robot may be fully human-controlled, or the robot may be semi-autonomous or autonomous in which at least some of the maneuvers are executed independent of or with minimal human intervention. In some examples, the robot is operable in various modes with various amounts of human control.

A robot designed and configurable to fly may at times be referred to as an aerial robot, an aerial vehicle, an aircraft or the like. A robot designed and configurable to operate with at least some level of autonomy may at times be referred to as an autonomous robot, or an autonomous aerial robot, autonomous aerial vehicle or autonomous aircraft in the case of an autonomous robot that is also designed and configurable to fly. Examples of suitable robots include aerobots, androids, automatons, autonomous vehicles, explosive ordnance disposal robots, hexapods, industrial robots, insect robots, microbots, nanobots, military robots, mobile robots, rovers, service robots, surgical robots, walking robots and the like. Other examples include a variety of unmanned vehicles, including unmanned ground vehicles (UGVs), unmanned aerial vehicles (UAVs), unmanned surface vehicles (USVs), unmanned underwater vehicles (UUVs), unmanned spacecraft and the like. These may include autonomous cars, planes, trains, industrial vehicles, fulfillment center robots, supply-chain robots, robotic vehicles, mine sweepers, and the like.

Figure 1:
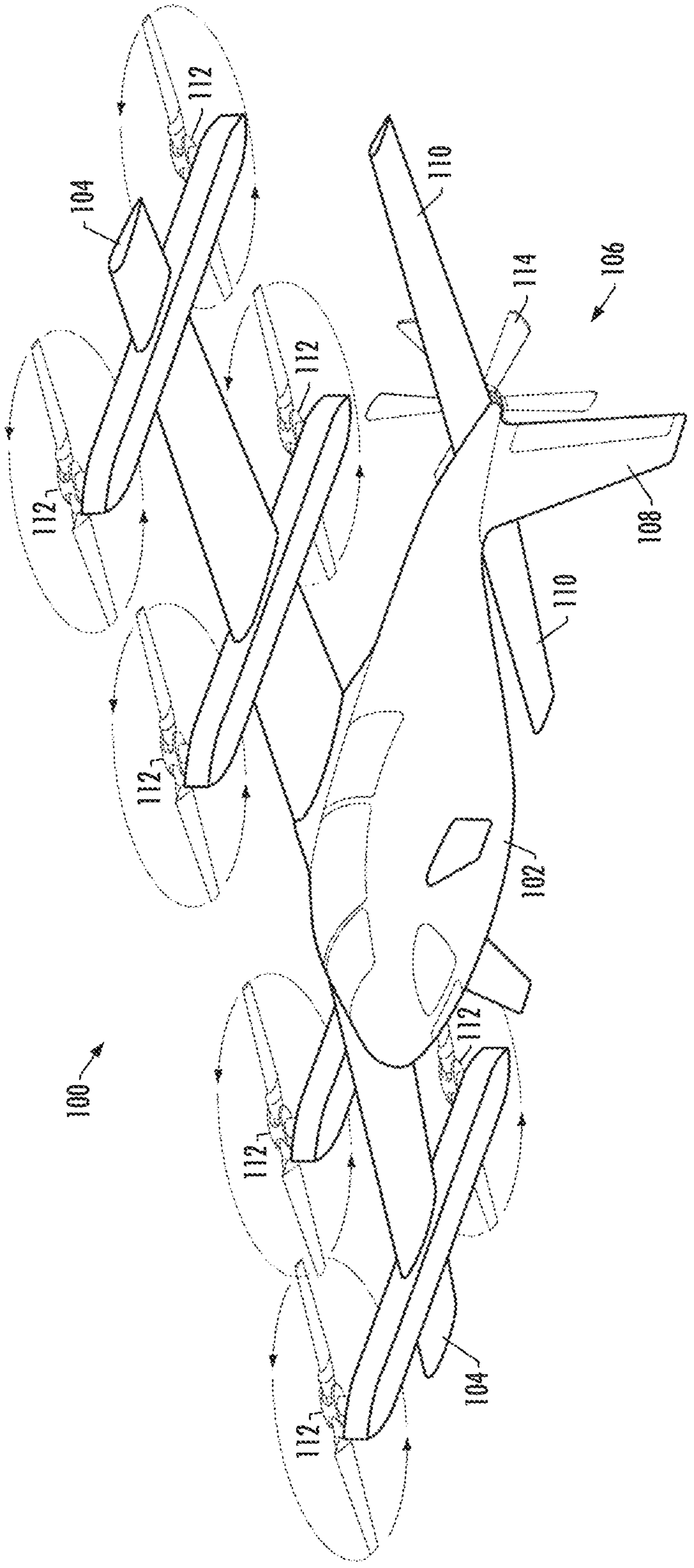
FIG. 1 illustrates one type of robot or more particularly aircraft, namely, an unmanned aerial vehicle, that may benefit from example implementations of the present disclosure.

FIG. 1 illustrates one type of robot or more particularly aircraft, namely, a UAV 100, that may benefit from example implementations of the present disclosure. As shown, the UAV generally includes a fuselage 102, wings 104 extending from opposing sides of the UAV in a mid-section of the fuselage, and an empennage or tail assembly 106 at a rear end of the fuselage. The tail assembly includes a vertical stabilizer 108 and two horizontal stabilizers 110 extending from opposing sides of the UAV. Rotors 112 and 114 are mounted to respectively the wings and the end of the tail assembly for lifting and propelling the UAV during flight.

Figure 2:
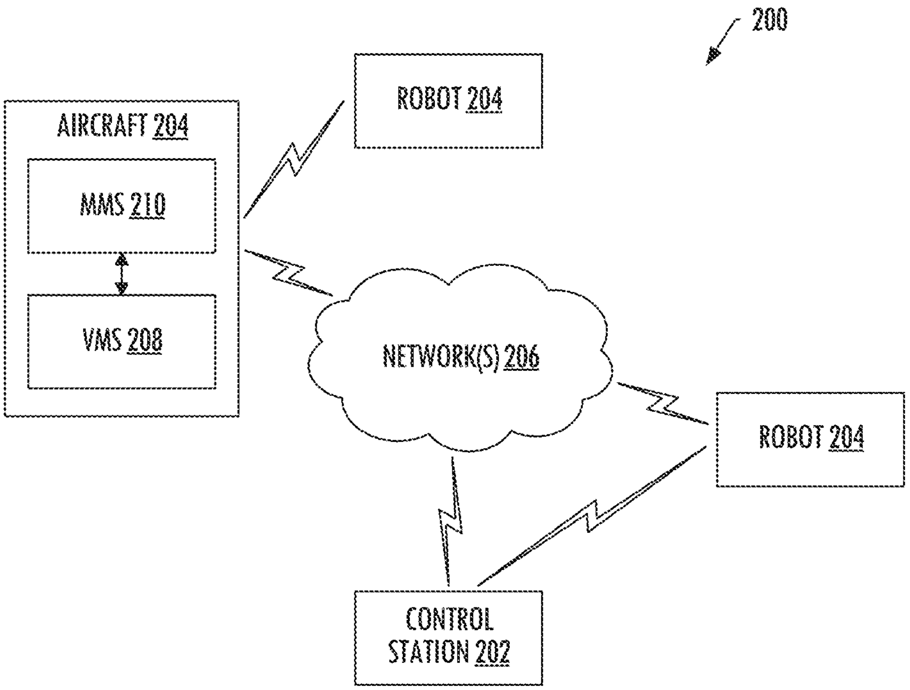
FIG. 2 illustrates a system according to some example implementations.

FIG. 2 illustrates a system 200 according to some example implementations of the present disclosure. The system may include any of a number of different subsystems (each an individual system) for performing one or more functions or operations. As shown, in some examples, the system includes a control station 202 and one or more robots such as one or more aircraft 204 (e.g., one or more UAVs 100). The control station provides facilities for communication with or control of the one or more aircraft, such as by wired or wireless data links directly or across one or more networks 206. In some examples, the control station may be a ground station, and not in all cases control the aircraft. In this regard, the control station may be configured to monitor the aircraft. The control station may initiate mission, but the control station may not control the aircraft to maneuver. At times, then, the control station may enable or provide a distributed network/server of software functions.

The aircraft 204 includes a robot management system (RMS) implemented as a vehicle management system (VMS) 208 and a mission management system (MMS) 210. The RMS is a robot-specific subsystem configured to manage subsystems and other components of the robot, and the VMS is a particular RMS implementation for a vehicle such as an aircraft. These subsystems and other components include, for example, maneuver controls, landing gear, onboard environmental systems, electrical, pneumatic and hydraulic systems, communications systems, navigation systems and other subsystems and components for controlling operation and maneuvering of the robot. The RMS/VMS is configured to accept maneuver commands such as waypoints and/or steering commands, and control the robot/aircraft to follow those maneuver commands.

The MMS 210 is a subsystem configured to manage missions of the aircraft 204. A mission is a deployment of the aircraft (one or more aircraft) to achieve one or more mission objectives. A mission may be decomposed into maneuvers of the aircraft with optional sensor and/or effector scheduling, and the MMS may execute tasks to manage the aircraft to execute maneuvers with specific parameters and capabilities. The MMS 210 includes subsystems to process sensor data to situational awareness, plan tasks for the aircraft (or multiple aircraft), coordinate with teams to assign tasks, execute assigned tasks. The MMS is also configured to interface with the RMS 208, and in some examples the control station 202. Although the MMS is shown on the aircraft, the MMS may instead be at the control station; or in some examples, the MMS may be distributed between the aircraft and the control station.

In some examples, the MMS 210 provides a complete, end-to-end autonomy architecture with open system architecture standards and parameterized to allow rapid extension and reapplication to a variety of robots including aircraft 204. The flexibility of the MMS enables an operator to code it once, but to apply it anywhere. The MMS may therefore be applied to virtually any robot that applies, or benefits from, autonomy. The MMS may include an adaptable autonomy architecture that is applicable to a variety of robots, including those identified above. A benefit of the MMS is therefore not only in the specific contents, but also in the specific details of the architecture, its subroutines, and in the interfaces between those subroutines and other systems/devices that support rapid extensibility and adaptability of the MMS to a variety of domains.

FIG. 3 more particularly illustrates the MMS 210 according to some example implementations of the present disclosure. The MMS may include any of a number of different subsystems (each an individual system) for performing one or more functions or operations. As shown, in some examples, the MMS includes an interface subsystem 302, a situational awareness subsystem 304, a mission planning subsystem 306, a mission coordination subsystem 308, and a mission execution subsystem 310. As suggested above, in some examples, the subsystems of the MMS may be on the aircraft 204, at the control station 202, or distributed between the aircraft and the control station. The subsystems may be configured to communicate with one another directly, over a communication bus 312, or across the network(s) 206 in examples in which the MMS is distributed between the aircraft and the control station.

The subsystems enable the MMS 210 of the aircraft 204 to interface with the system 200, perform situational awareness, plan a mission including a plurality of tasks, coordinate the plurality of tasks and thereby the mission with other aircraft 204, and execute the mission. For example, the MMS may use the interface subsystem 302 to interface with various sensors onboard the aircraft, the RMS 208, the control station 202 and/or other aircraft. The MMS may use the situational awareness subsystem 304 to acquire sensor data and maintain an awareness of the state of the environment in which the aircraft is operating. The MMS may use the mission planning subsystem 306 to plan a mission including or associated with a plurality of tasks, and which may incorporate rules of engagement, tactics and other constraints on operations. The MMS may likewise use the mission planning subsystem to dynamically replan a mission in which changes to the mission are made in real-time or near real-time as the mission is executed. The MMS may use the mission coordination subsystem 308 to coordinate the plurality of tasks of the mission with other aircraft and users, where agreed-upon tasks may then be executed by the MMS using the mission execution subsystem 310.

According to some example implementations of the present disclosure, the MMS 210 is also configured to implement software functionality or functionalities (at times referred to as services) during a mission to support the aircraft 204. This may include horizon detection in which true horizon separating earth from sky is detected in images of views of an environment of the aircraft. This may be the line where the sphere of the earth meets the sky. It may be a straight horizontal line at long distance from the aircraft, and appear to be at eye level as seen by a viewer, even at flight altitude. FIGS. 4A, 4B and 4C illustrate images 400, 402, 404 of views of an environment acquired at different altitudes, and illustrate how the true horizon 406 may not be visible closer to ground-level, and become more visible as the aircraft is flown at a higher altitude than local obstructions 408.

FIG. 5 is a diagram of services 500 that may be implemented by the situational awareness subsystem 304 to support the aircraft 204 on a mission, according to some example implementations. As shown, the services may include a horizon detection 502 service and a validation 504 service that may be implemented by the situational awareness subsystem. The horizon detection service is generally configured to determine true horizon 506 in an image 508 that depicts view of an environment of the aircraft. The validation service is generally configured to perform an evaluation of the true horizon as determined by the horizon detection service to verify expected characteristics.

The horizon detection 502 service is configured to acquire an image 508 that depicts a view of an environment. The image may be acquired from a number of different sources, such as from a sensor onboard the aircraft. One example of a suitable sensor is an imager configured to convey (or in some examples detect and convey) information from which the image is generated. This information may include points of the image that are spatially arranged to represent objects depicted in the image, the points corresponding to pixels of a digital image, or data points of a point cloud. The imager may employ any of a number of different technologies such as acoustics, radio, optics and the like. More particular examples of suitable imagers include those employing radar, lidar, infrared sensors, cameras and the like. In various examples, the image may be a digital image in black-and-white or color.

In some examples, the horizon detection 502 service is configured to perform an image processing on the image 508, which may correct the image to facilitate determination of true horizon 506 across a frame of the image. This correction may be due to an imperfect lens of an imager from which the image is acquired, and the correction may address a number of issues such as vignetting (darkening towards the image corners), pin cushioning, barrel distortion or the like. In some examples in particular, a number of random images may be averaged together to produce a static filter to which the image may be applied to correct for vignetting.

The horizon detection 502 service is configured to define a line pattern of lines that divide the image 508 into respective pairs of image segments. The line pattern is formed of lines that are parallel (shown in FIG. 5), or intersecting at a common point of intersection. The horizon detection service is configured to search the lines of the line pattern to identify one of the lines) as an estimated true horizon in the image that divides the image into a respective pair of image segments at a boundary of greatest difference in average brightness between the image segments from among the respective pairs of image segments. And the horizon detection service is configured to determine true horizon in the image from the estimated true horizon.

In some examples, the horizon detection 502 service is configured to perform an iterative search of the image 508 to identify the estimated true horizon. The iterative search is performed over line patterns that alternate between linear patterns and rotational patterns, an iteration of the iterative search including define the line pattern formed of the lines that are parallel for the linear patterns, and intersecting at a common point of intersection for the rotational patterns. The horizon detection service is configured to search the lines of the line pattern to identify the one of the lines, and classify one of the lines as a local estimated true horizon for the iteration. This local estimated true horizon, then, is input to a next iteration, or identified as the estimated true horizon when the iteration is a last iteration in the iterative search. In this regard, the line classified as the local estimated true horizon for the iteration may be input to the next iteration of the iterative search in which the line pattern is defined from and includes the line.

FIGS. 6A, 6B and 6C illustrate an image 600 for which the horizon detection 502 service may perform an iterative search to identify the estimated true horizon, according to some example implementations. As shown in FIG. 6A, in some examples, the line pattern for the iteration is a linear pattern 602 of parallel lines. The horizon detection 502 service is configured to search the parallel lines of the line pattern to identify a line 604 that is classified as the local estimated true horizon for the iteration, which is the one of the parallel lines at a boundary of greatest difference in average brightness between image segments 606, as shown in the plot 608.

As shown in FIG. 6B, the line 604 classified as the local estimated true horizon for the iteration is input to the next iteration in which the line pattern is a rotational pattern 610 of intersecting lines defined from and including the line, and the common point of intersection centered on the line. The horizon detection 502 service is configured to search the intersecting lines of the line pattern to identify a second line 612 that is classified as the local estimated true horizon for the next iteration, which is the one of the intersecting lines at the boundary of greatest difference in average brightness between image segments 614, as shown in the plot 616.

As shown in FIG. 6C, in some examples, the second line classified 612 as the local estimated true horizon for the next iteration is input to a further iteration in which the line pattern is a second linear pattern 618 of parallel lines defined from and including the second line. As shown, the parallel lines of the second linear pattern are set at an angle with respect to the line of the linear pattern; and in some examples, the parallel lines of the linear pattern and the second linear pattern have different densities. Once again, the horizon detection 502 service is configured to search the parallel lines of the line pattern to identify a line 620 (a third line) that is classified as the local estimated true horizon for the iteration. The line, again, is the one of the parallel lines at the boundary of greatest difference in average brightness between image segments 622, as shown in the plot 624.

In some more particular implementations, horizon detection 502 service may scan the image 600 from top to bottom over lines of the linear pattern 602 as shown in FIG. 6A. For each line of the line pattern, the horizon detection service may determine a differential brightness as an average pixel brightness above the line, minus the average below the line. The plot 608 of the differential brightness versus line position may give something like a bell curve, and the line 604 at the maximum may be classified as the local estimated true horizon. In FIG. 6A, a coarse sampling of parallel lines is shown, although a more-dense sampling of parallel lines may be used instead, with a tradeoff between speed and precision of the scan.

A second scan of the image 600 may be performed as shown in FIG. 6B. Here, the rotational pattern 610 that may be defined by rotating the line 604 about its center point. This time, the line 612 of the line pattern with the maximum differential brightness may indicate an angle of true horizon. In FIG. 6B, again, a smaller rotational step size may be used for accuracy at the cost of computational speed.

A third scan of the image 600 may be performed as shown in FIG. 6C, with lines of the second linear pattern 618 parallel to one another, and normal to the selected horizon angle. In FIG. 6C, the line 612 may be linearly swept, and the line 620 may be selected with the maximum differential brightness. This may fine tune the true horizon position. The linear and rotational scans may be repeated multiple times for increased precision, but three scans may provide sufficient accuracy without undue computing time. In situations in which the true horizon in the image is vertical or close to vertical, such as when the aircraft 204 is in a 90-degree bank, the second linear scan may provide added benefit over the first scan in which the linear pattern is made up of horizontal lines.

Although FIGS. 6A-6C illustrate alternating linear-rotational-linear patterns, the iterations may include more or fewer iterations. Likewise, the iterations may instead alternate rotational-linear patterns. Returning to FIGS. 6B and 6C, in some examples, the line pattern for the iteration is a rotational pattern 610 of intersecting lines, and the line 612 classified as the local estimated true horizon for the iteration may be input to the next iteration in which the line pattern is a linear pattern 618 of parallel lines defined from and including the line 612. A line 620 (here a second line) classified as the local estimated true horizon for the next iteration, then, may be input to a further iteration in which the line pattern is a second rotational pattern of intersecting lines defined from and including the second line, and with the common point of intersection centered on the second line. This pattern may be similar to the rotational pattern in FIG. 6B, but defined from and including the line 620. Similar to before, the intersecting lines of the rotational pattern and the second rotational pattern may have different densities.

In some examples, the horizon detection 502 service is configured to identify the estimated true horizon as the true horizon 506. In some other examples, the horizon detection service is configured to perform an edge detection to identify line segments in the image. The horizon detection service is configured to evaluate the line segments based on the estimated true horizon to identify one of the line segments that has a higher probability of being the true horizon. This may include an evaluation of only those of the line segments that are within a tolerance band around the estimated true horizon. The horizon detection service is then configured to classify the one of the line segments or a curve fit (e.g., linear fit) to the one of the line segments as the true horizon. In this regard, the estimated true horizon may be adjusted by switching to a curve fit to the edge detection points when the one of the line segments mostly matches the estimated true horizon. The curve fit may further improve the horizon detection in that distant ground features that fade to white due to haze may be averaged out and not otherwise classified as sky.

Again, the validation 504 service is generally configured to perform an evaluation of the true horizon 506 as determined by the horizon detection service to verify expected characteristics, which may prevent a false positive of the true horizon as detected. In this regard, the validation service may be configured to perform an evaluation of at least one of the estimated true horizon or the true horizon as determined from the estimated true horizon to verify one or more expected characteristics. And an indication of the true horizon may be output only when the at least one of the estimated true horizon or the true horizon as determined is verified.

The validation 504 service may be configured to perform the evaluation on the true horizon 506 as determined from the estimated true horizon. In other examples, the validation service is configured to perform the evaluation on the estimated true horizon. In some of these examples, the evaluation includes a first evaluation and a second evaluation. The first evaluation is performed on the estimated true horizon, and the second evaluation is performed on the true horizon as determined from the estimated true horizon. In some of these examples, the second evaluation is performed only when the estimated true horizon is verified.

Again, the horizon detection 502 service may be configured to determine true horizon 506 in an image 508. The true horizon may be expressed as a line or line segment in the image, with the line or line segment dividing the image into image segments. The validation 504 service is configured to perform an evaluation of the true horizon as determined to verify expected characteristics of the line or line segment, the image segments, and the image. And the validation service is configured to output an indication of the true horizon only when the true horizon is verified.

In some examples in which the image 508 is acquired from the aircraft 204, the validation 504 service may verify the expected characteristics that include multiple ones of (a) a relative brightness of the image segments oriented according to an attitude of the aircraft, (b) at least one of roughness or curvature of the line or line segment, (c) an extent of the line or line segment, or (d) a brightness profile of the image along one or more transects that intersect the line or line segment.

The relative brightness of the image segments may be useful to determine which of the image segments is the "sky-side" of the true horizon based on average brightness. If the sky-side is not consistent with the expected attitude of the aircraft 204, the validation 504 service may reject the true horizon determined by the horizon detection 502 service. For example, if the bottom of the image is brighter than the top, and the aircraft is known to not be inverted, the validation service may identify the true horizon from the horizon detection service as a false positive. If more precise aircraft attitude information is available, it may be used to further eliminate a false true horizon based on angle and position.

In some examples, then, the validation 504 service is configured to determine a first of the image segments (e.g., image segments 622) relative to a second of the image segments. The first of the image segments is brighter than the second of the image segments, or has a greater intensity of one or more colors (e.g., blue for the sky-side) relative to the second of the image segments. The validation service is configured to determine an expected orientation of the first and the second of the image segments based on an attitude of the aircraft. And the validation service is configured to evaluate the first and the second of the image segments to verify the expected orientation.

FIG. 7A illustrates an image 700 in which a true horizon 702 is determined from an estimated true horizon 704 that divides the image into two image segments 706. The true horizon here may be determined from an edge detection in which the true horizon is expressed as a line or line segment. In some of these examples, the validation 504 service is configured to define a tolerance band 708 around the estimated true horizon, and evaluate the line or line segment within the tolerance band or within a defined number of excursions outside the tolerance band. In this regard, the tolerance band may be determined in a number of different manners, such as based on a number of test images. And an excursion is a crossing of the line or line segment from within the tolerance band to outside the tolerance band.

In some examples, the validation 504 service is configured to determine at least one of roughness or curvature of the line or line segment (that expresses the true horizon 704) within the tolerance band 708, and based on proximity of the line or line segment to a boundary of the tolerance band. The validation service is configured to evaluate the at least one of the roughness or curvature of the line or line segment to verify the at least one of the roughness or curvature is within a defined tolerance, which again, may be determined from test images. In this regard, the validation service may be configured to determine a rate of change of the proximity of the line or line segment to the boundary of the tolerance band.

In some examples, the tolerance band 708 extends across the image 700, and the line or line segment that expresses the true horizon 704 is evaluated to verify that an extent of the line or line segment within the tolerance band is at least a threshold amount of the extent of the tolerance band. The threshold amount may be determined in a number of different manners, such as based on test images. One example of a suitable threshold amount is 75% of the extent of the tolerance band.

In some examples, the validation 504 service is configured to define a transect that intersects the line or line segment. FIG. 7B illustrates the image 700 from FIG. 7A, and including transects 710 that intersect the line or line segment. In some of these examples, the validation service is configured to determine a brightness profile of the image along the transect. FIG. 7B illustrates the image 700 from FIG. 7A, and including transects 710 that intersect the line or line segment. In some examples in which multiple transects are defined, the validation 504 service is configured to determine component brightness profiles of the image along respective ones of the transects, and determine the brightness profile from the component brightness profiles. The validation service, then, is configured to evaluate the brightness profile to verify the brightness profile has at least a threshold similarity with a defined reference profile, such as may be determined from test images or other suitable analysis.

FIG. 8 illustrates a defined reference profile 800, according to some example implementations. As shown, the transect is brighter on the sky-side, and includes a particular profile as the transect approaches and then crosses the line or line segment as the true horizon. When comparing the brightness profile from a transect 710 to the defined reference profile, brightness curves may be aligned (left to right in the axes shown) to provide a best match before deciding if they fit within the threshold of a match. This may effectively correct for any places where the true horizon does not fall in the same place on each transect because of variations in the shape of the true horizon, or slight misalignments of the estimated horizon line.

FIG. 9 illustrates an image 900 in which an estimated true horizon 902 is determined, an edge detection is performed to identify line segments 904A, 904B, 904C, 904D and 904E in the image, and a tolerance band 906 defined around the estimated true horizon. In the image, the validation 504 service may reject the line segment 904A at the cloud bottom as a short transect across the edge line would show it is dark above the edge line and bright below, and therefore does not match the defined brightness profile 800. This line segment is also too short, although a low cloud layer could stretch across the entire frame of the image.

Falling within the tolerance band 906 is the line segment 904B that expresses the true horizon. This line segment stretches more than halfway across the frame of the image 900, and has a brightness profile that matches the defined brightness profile 800.

The line segments 904C at the hill sides of the image 900 have curvatures that are outside a defined tolerance, most are too short, and are outside the tolerance band 906. The line segment 904D on the trees has a roughness outside a defined tolerance, and is outside the tolerance band. And the line segments 904E on the rock edges are too short, relative brightness of the image segments on either side of the line segments are not correctly oriented, and the line segments have brightness profiles that do not match the defined brightness profile 800.

Again, as explained above with respect to FIGS. 2, 3 and 5, the services 500 including the horizon detection 502 service and the validation 504 service implemented by the situational awareness subsystem 304 to support an aircraft 204 on a mission. In this regard, the situational awareness subsystem may output an indication of the true horizon in the image 508 for use in at least one of guidance, navigation or control of the aircraft as the aircraft maneuvers in the environment. This may include the MMS 210 that includes the situational awareness subsystem generating maneuver commands such as waypoints and/or steering commands based on the true horizon, and the VMS 208 may accept these maneuver commands to control the aircraft to follow those maneuver commands. In other examples, the indication of true horizon may be used as part of an object detection in the to identify an object of interest in the image, either in real time or in a post-processing operation.

FIGS. 10A-10F are flowcharts illustrating various steps in a method 1000 of horizon detection, according to various example implementations of the present disclosure. The method includes acquiring an image that depicts a view of an environment, as shown at block 1002 of FIG. 10A. The method includes defining a line pattern of lines that divide the image into respective pairs of image segments, as shown at block 1004. The line pattern may be formed of lines that are parallel, or intersecting at a common point of intersection. The method includes searching the lines of the line pattern to identify one of the lines as an estimated true horizon in the image that divides the image into a respective pair of image segments at a boundary of greatest difference in average brightness between the image segments from among the respective pairs of image segments, as shown at block 1006. And the method includes determining true horizon in the image from the estimated true horizon, as shown at block 1008.

In some examples, the method 1000 further includes performing an image processing on the image before the lines of the line pattern are searched, as shown at block 1010.

Figure 10A:
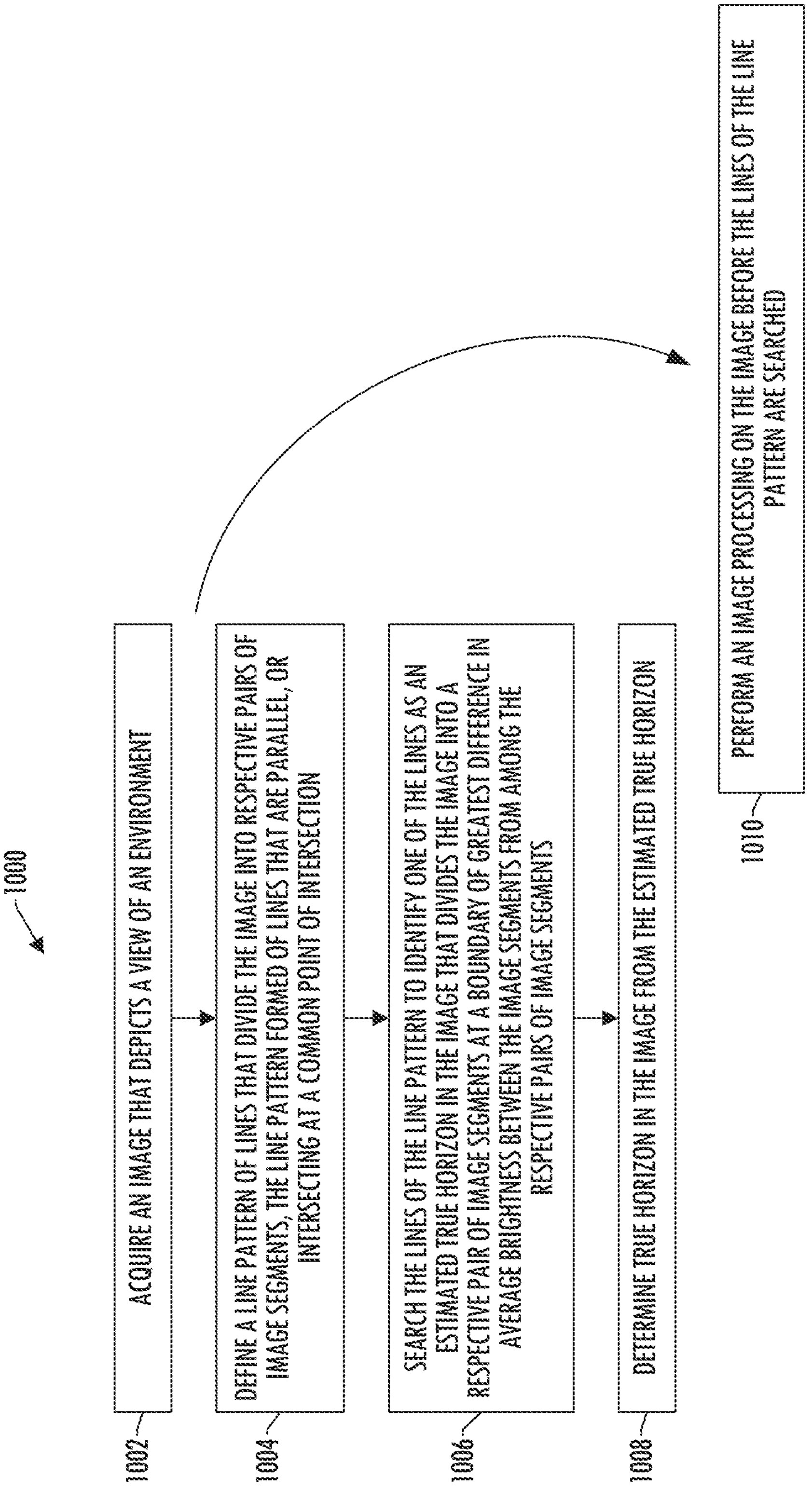
Figure 10B:
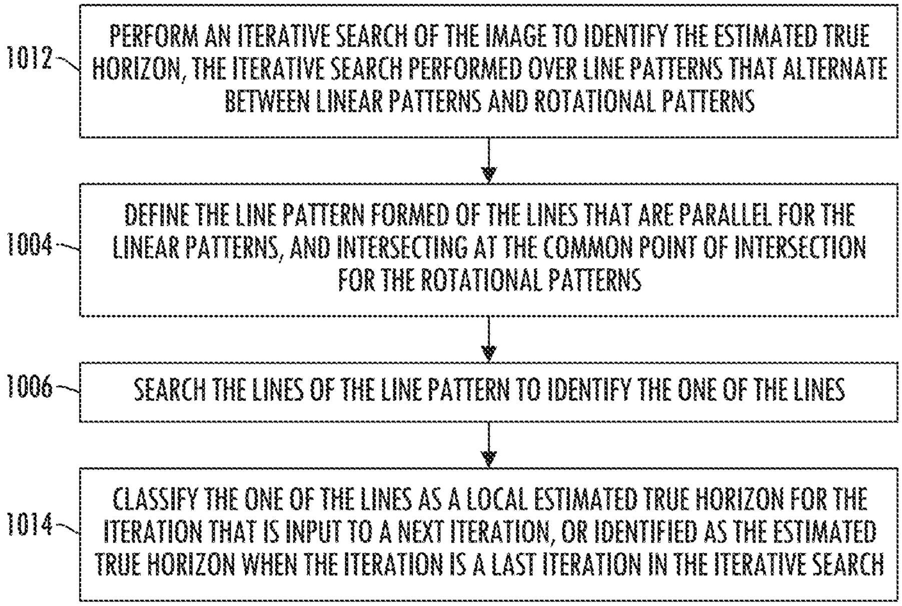

In some examples, the method 1000 further includes performing an iterative search of the image to identify the estimated true horizon, the iterative search performed over line patterns that alternate between linear patterns and rotational patterns, as shown at block 1012 of FIG. 10B. In some of these examples, an iteration of the iterative search includes defining the line pattern formed of the lines that are parallel for the linear patterns, and intersecting at a common point of intersection for the rotational patterns, as shown at block 1004. The method includes searching the lines of the line pattern to identify the one of the lines, as again shown at block 1006. And the method includes classifying the one of the lines as a local estimated true horizon for the iteration that is input to a next iteration, or identified as the estimated true horizon when the iteration is a last iteration in the iterative search, as shown at block 1014.

In some further examples, the iteration is before the last iteration in the iterative search, and the line classified as the local estimated true horizon for the iteration is input to the next iteration of the iterative search in which the line pattern is defined from and includes the line.

In some even further examples, the line pattern for the iteration is a linear pattern of parallel lines, and the line classified as the local estimated true horizon for the iteration is input to the next iteration in which the line pattern is a rotational pattern of intersecting lines defined from and including the line, and the common point of intersection centered on the line.

In some yet further examples, a second line classified as the local estimated true horizon for the next iteration is input to a further iteration in which the line pattern is a second linear pattern of parallel lines defined from and including the second line, and the parallel lines of the second linear pattern are set at an angle with respect to the line of the linear pattern. And in some examples, the parallel lines of the linear pattern and the second linear pattern have different densities.

In some examples, the line pattern for the iteration is a rotational pattern of intersecting lines, and the line classified as the local estimated true horizon for the iteration is input to the next iteration in which the line pattern is a linear pattern of parallel lines defined from and including the line.

In some further examples, a second line classified as the local estimated true horizon for the next iteration is input to a further iteration in which the line pattern is a second rotational pattern of intersecting lines defined from and including the second line, and with the common point of intersection centered on the second line. And in some even further examples, the intersecting lines of the rotational pattern and the second rotational pattern have different densities.

In some examples, the iteration is the last iteration in the iterative search, and the local estimated true horizon for the last iteration is identified as the estimated true horizon.

Figure 10C:
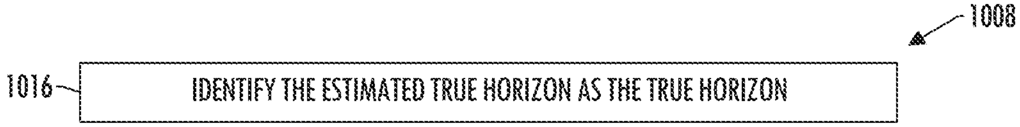
Figure 10D:
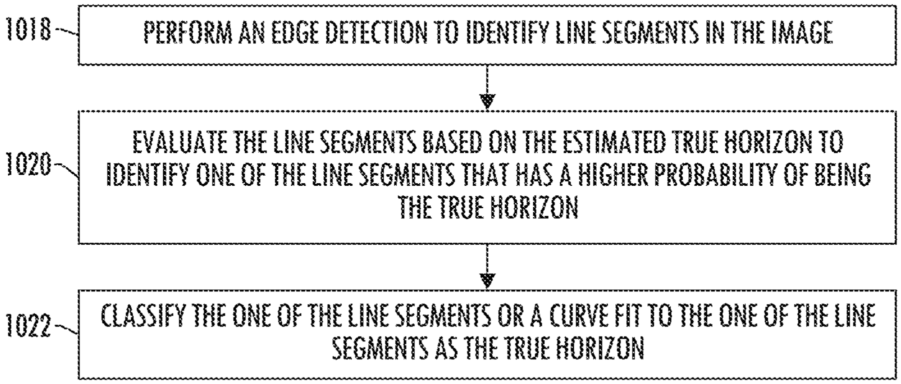

In some examples, determining the true horizon at block 1008 includes identifying the estimated true horizon as the true horizon, as shown at block 1016 of FIG. 10C. In some examples, determining the true horizon at block 1008 includes performing an edge detection to identify line segments in the image, as shown at block 1018 of FIG. 10D. In some of these examples, the method includes evaluating the line segments based on the estimated true horizon to identify one of the line segments that has a higher probability of being the true horizon, as shown at block 1020. And the method includes classifying the one of the line segments or a curve fit to the one of the line segments as the true horizon, as shown at block 1022.

Figure 10E:
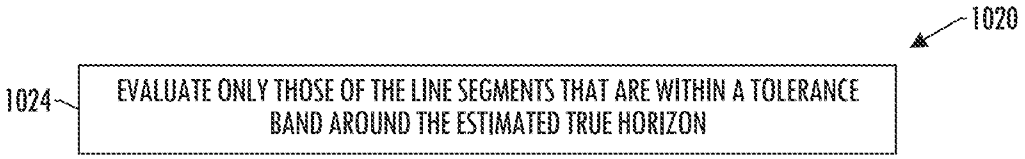

In some examples, evaluating the line segments at block 1020 includes evaluating only those of the line segments that are within a tolerance band around the estimated true horizon, as shown at block 1024 of FIG. 10E.

Figure 10F:
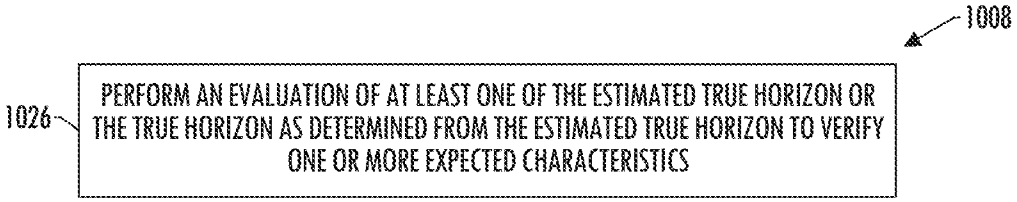

In some examples, the method 1000 further includes performing an evaluation of at least one of the estimated true horizon or the true horizon as determined from the estimated true horizon to verify one or more expected characteristics, as shown at block 1026 of FIG. 10F. In some of these examples, an indication of the true horizon is output only when the at least one of the estimated true horizon or the true horizon as determined is verified. In some further examples, the evaluation is performed at block 1026 on the estimated true horizon. In even further some examples, the evaluation includes a first evaluation performed on the estimated true horizon, and a second evaluation performed on the true horizon as determined from the estimated true horizon, the second evaluation performed only when the estimated true horizon is verified.

In some examples, the evaluation is performed at block 1026 on the true horizon as determined from the estimated true horizon.

FIGS. 11A-11K are flowcharts illustrating various steps in a method 1100 of horizon detection, according to various example implementations of the present disclosure. The method includes acquiring an image that depicts a view of an environment, as shown at block 1102 of FIG. 11A. The method includes determining true horizon in the image, the true horizon expressed as a line or line segment in the image, the line or line segment dividing the image into image segments, as shown at block 1104. The method includes performing an evaluation of the true horizon as determined to verify expected characteristics of the line or line segment, the image segments, and the image, as shown at block 1106. And the method includes outputting an indication of the true horizon only when the true horizon is verified, as shown at block 1108.

In some examples, the method 1100 further includes performing an image processing on the image before the true horizon is determined, as shown at block 1110.

In some examples, determining the true horizon at block 1104 includes performing an edge detection to identify line segments in the image, as shown at block 1112 of FIG. 11B. In some of these examples, the method includes evaluating the line segments to identify one of the line segments that has a higher probability of being the true horizon, as shown at block 1114. And the method includes classifying the one of the line segments or a curve fit to the one of the line segments as the true horizon, as shown at block 1116.

In some examples, the method 1100 further includes performing an iterative search of the image to identify an estimated true horizon that divides the image into two image segments, as shown at block 1118 of FIG. 11C. In some of these examples, the true horizon is determined at block 1104 from the estimated true horizon. In some more particular examples, determining the true horizon at block 1104 includes identifying the estimated true horizon as the true horizon, as shown at block 1120.

In some examples, determining the true horizon at block 1104 includes performing an edge detection to identify line segments in the image, as shown at block 1122 of FIG. 11D. In some of these examples, the method 1100 includes evaluating the line segments based on the estimated true horizon to identify one of the line segments that has a higher probability of being the true horizon, as shown at block 1124. And the method includes classifying the one of the line segments as the true horizon, as shown at block 1126.

In some examples, evaluating the line segments at block 1124 includes evaluating only those of the line segments that are within a tolerance band around the estimated true horizon, as shown at block 1128 of FIG. 11E.

In some examples, the image is acquired from an aircraft, the evaluation is performed at block 1106 to verify the expected characteristics that include multiple ones of (a) a relative brightness of the image segments oriented according to an attitude of the aircraft, (b) at least one of roughness or curvature of the line or line segment, (c) an extent of the line or line segment, or (d) a brightness profile of the image along one or more transects that intersect the line or line segment.

In some examples, the image is acquired from an aircraft, and performing the evaluation at block 1106 includes determining a first of the image segments relative to a second of the image segments, the first of the image segments being brighter than the second of the image segments, or having a greater intensity of one or more colors relative to the second of the image segments, as shown at block 1130 of FIG. 11F. The method 1100 includes determining an expected orientation of the first and the second of the image segments based on an attitude of the aircraft, as shown at block 1132. And the method includes evaluating the first and the second of the image segments to verify the expected orientation, as shown at block 1134.

In some examples, the true horizon is determined at block 1104 from an estimated true horizon that divides the image into two image segments, and performing the evaluation at block 1106 includes defining a tolerance band around the estimated true horizon, as shown at block 1136 of FIG. 11G. And the method 1100 includes evaluating the line or line segment within the tolerance band or within a defined number of excursions outside the tolerance band, as shown at block 1138.

In some further examples, evaluating the line or line segment at block 1138 includes determining at least one of roughness or curvature of the line or line segment within the tolerance band, and based on proximity of the line or line segment to a boundary of the tolerance band, as shown at block 1140 of FIG. 11H. The method includes evaluating the at least one of the roughness or curvature of the line or line segment to verify the at least one of the roughness or curvature is within a defined tolerance, as shown at block 1142. And in some even further examples, determining the at least one of roughness or curvature of the line or line segment at block 1140 includes determining a rate of change of the proximity of the line or line segment to the boundary of the tolerance band, as shown at block 1144 of FIG. 11I.

In some examples, the tolerance band extends across the image, and the line or line segment is evaluated to verify that an extent of the line or line segment within the tolerance band is at least a threshold amount of the extent of the tolerance band.

In some examples, performing the evaluation at block 1106 includes defining a transect that intersects the line or line segment, as shown at block 1146 of FIG. 11J. The method includes determining a brightness profile of the image along the transect, as shown at block 1148. And the method includes evaluating the brightness profile to verify the brightness profile has at least a threshold similarity with a defined reference profile, as shown at block 1150.

In some examples, defining the transect at block 1146 includes defining transects that intersect the line or line segment, as shown at block 1152 of FIG. 11K; and determining the brightness profile at block 1148 includes determining component brightness profiles of the image along respective ones of the transects, as shown at block 1154. And the method includes determining the brightness profile from the component brightness profiles, as shown at block 1156.

According to example implementations of the present disclosure, the MMS 210 and its subsystems including the interface subsystem 302, situational awareness subsystem 304, mission planning subsystem 306, mission coordination subsystem 308 and mission execution subsystem 310 may be implemented by various means. Means for implementing the MMS and its subsystems may include hardware, alone or under direction of one or more computer programs from a computer-readable storage medium. In some examples, one or more apparatuses may be configured to function as or otherwise implement the MMS and its subsystems shown and described herein. In examples involving more than one apparatus, the respective apparatuses may be connected to or otherwise in communication with one another in a number of different manners, such as directly or indirectly via a wired or wireless network or the like.

FIG. 12 illustrates an apparatus 1200 according to some example implementations of the present disclosure. Generally, an apparatus of exemplary implementations of the present disclosure may comprise, include or be embodied in one or more fixed or portable electronic devices. The apparatus may include one or more of each of a number of components such as, for example, processing circuitry 1202 (e.g., processor unit) connected to a memory 1204 (e.g., storage device).

The processing circuitry 1202 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 1204 (of the same or another apparatus).

The processing circuitry 1202 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 1204 is generally any piece of computer hardware that is capable of storing information such as, for example, data, computer programs (e.g., computer-readable program code 1206) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1204, the processing circuitry 1202 may also be connected to one or more interfaces for displaying, transmitting and/or receiving information. The interfaces may include a communications interface 1208 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1210 and/or one or more user input interfaces 1212 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 1200 may include a processing circuitry 1202 and a computer-readable storage medium or memory 1204 coupled to the processing circuitry, where the processing circuitry is configured to execute computer-readable program code 1206 stored in the memory. It will also be understood that one or more functions, and combinations of functions, may be implemented by special purpose hardware-based computer systems and/or processing circuitry which perform the specified functions, or combinations of special purpose hardware and program code instructions.

As explained above and reiterated below, the present disclosure includes, without limitation, the following example implementations.

Clause 1. An apparatus for horizon detection, the apparatus comprising: a memory configured to store computer-readable program code; and processing circuitry configured to access the memory, and execute the computer-readable program code to cause the apparatus to at least: acquire an image that depicts a view of an environment; define a line pattern of lines that divide the image into respective pairs of image segments; search the lines of the line pattern to identify one of the lines as an estimated true horizon in the image that divides the image into a respective pair of image segments at a boundary of greatest difference in average brightness between the image segments from among the respective pairs of image segments; and determine true horizon in the image from the estimated true horizon.

Clause 2. The apparatus of clause 1, wherein the processing circuitry is configured to execute the computer-readable program code to cause the apparatus to further perform an image processing on the image before the lines of the line pattern are searched.

Clause 3. The apparatus of clause 1 or clause 2, wherein the processing circuitry is configured to execute the computer-readable program code to cause the apparatus to further perform an iterative search of the image to identify the estimated true horizon, the iterative search performed over line patterns that alternate between linear patterns and rotational patterns, an iteration of the iterative search including: define the line pattern formed of the lines that are parallel for the linear patterns, and intersecting at a common point of intersection for the rotational patterns; search the lines of the line pattern to identify the one of the lines; and classify the one of the lines as a local estimated true horizon for the iteration that is input to a next iteration, or identified as the estimated true horizon when the iteration is a last iteration in the iterative search.

Clause 4. The apparatus of clause 3, wherein the iteration is before the last iteration in the iterative search, and the line classified as the local estimated true horizon for the iteration is input to the next iteration of the iterative search in which the line pattern is defined from and includes the line.

Clause 5. The apparatus of clause 4, wherein the line pattern for the iteration is a linear pattern of parallel lines, and the line classified as the local estimated true horizon for the iteration is input to the next iteration in which the line pattern is a rotational pattern of intersecting lines defined from and including the line, and the common point of intersection centered on the line.

Clause 6. The apparatus of clause 5, wherein a second line classified as the local estimated true horizon for the next iteration is input to a further iteration in which the line pattern is a second linear pattern of parallel lines defined from and including the second line, and the parallel lines of the second linear pattern are set at an angle with respect to the line of the linear pattern.

Clause 7. The apparatus of clause 6, wherein the parallel lines of the linear pattern and the second linear pattern have different densities.

Clause 8. The apparatus of any of clauses 4 to 7, wherein the line pattern for the iteration is a rotational pattern of intersecting lines, and the line classified as the local estimated true horizon for the iteration is input to the next iteration in which the line pattern is a linear pattern of parallel lines defined from and including the line.

Clause 9. The apparatus of clause 8, wherein a second line classified as the local estimated true horizon for the next iteration is input to a further iteration in which the line pattern is a second rotational pattern of intersecting lines defined from and including the second line, and with the common point of intersection centered on the second line.

Clause 10. The apparatus of clause 9, wherein the intersecting lines of the rotational pattern and the second rotational pattern have different densities.

Clause 11. The apparatus of any of clauses 3 to 10, wherein the iteration is the last iteration in the iterative search, and the local estimated true horizon for the last iteration is identified as the estimated true horizon.

Clause 12. The apparatus of any of clauses 1 to 11, wherein the apparatus caused to determine the true horizon includes the apparatus caused to identify the estimated true horizon as the true horizon.

Clause 13. The apparatus of any of clauses 1 to 12, wherein the apparatus caused to determine the true horizon includes the apparatus caused to: perform an edge detection to identify line segments in the image; evaluate the line segments based on the estimated true horizon to identify one of the line segments that has a higher probability of being the true horizon; and classify the one of the line segments or a curve fit to the one of the line segments as the true horizon.

Clause 14. The apparatus of clause 13, wherein the apparatus caused to evaluate the line segments includes the apparatus caused to evaluate only those of the line segments that are within a tolerance band around the estimated true horizon.

Clause 15. The apparatus of any of clauses 1 to 14, wherein the processing circuitry is configured to execute the computer-readable program code to cause the apparatus to further perform an evaluation of at least one of the estimated true horizon or the true horizon as determined from the estimated true horizon to verify one or more expected characteristics, and wherein an indication of the true horizon is output only when the at least one of the estimated true horizon or the true horizon as determined is verified.

Clause 16. The apparatus of clause 15, wherein the evaluation is performed on the estimated true horizon.

Clause 17. The apparatus of clause 16, wherein the evaluation includes a first evaluation performed on the estimated true horizon, and a second evaluation performed on the true horizon as determined from the estimated true horizon, the second evaluation performed only when the estimated true horizon is verified.

Clause 18. The apparatus of any of clauses 15 to 17, wherein the evaluation is performed on the true horizon as determined from the estimated true horizon.

Clause 19. An apparatus for horizon detection, the apparatus comprising: a memory configured to store computer-readable program code; and processing circuitry configured to access the memory, and execute the computer-readable program code to cause the apparatus to at least: acquire an image that depicts a view of an environment; determine true horizon in the image, the true horizon expressed as a line or line segment in the image, the line or line segment dividing the image into image segments; perform an evaluation of the true horizon as determined to verify expected characteristics of the line or line segment, the image segments, and the image; and output an indication of the true horizon only when the true horizon is verified.

Clause 20. The apparatus of clause 19, wherein the processing circuitry is configured to execute the computer-readable program code to cause the apparatus to further perform an image processing on the image before the true horizon is determined.

Clause 21. The apparatus of clause 19 or clause 20, wherein the apparatus caused to determine the true horizon includes the apparatus caused to: perform an edge detection to identify line segments in the image; evaluate the line segments to identify one of the line segments that has a higher probability of being the true horizon; and classify the one of the line segments or a curve fit to the one of the line segments as the true horizon.

Clause 22. The apparatus of any of clauses 19 to 21, wherein the processing circuitry is configured to execute the computer-readable program code to cause the apparatus to further perform an iterative search of the image to identify an estimated true horizon that divides the image into two image segments, and wherein the true horizon is determined from the estimated true horizon.

Clause 23. The apparatus of clause 22, wherein the apparatus caused to determine the true horizon includes the apparatus caused to identify the estimated true horizon as the true horizon.

Clause 24. The apparatus of clause 22 or clause 23, wherein the apparatus caused to determine the true horizon includes the apparatus caused to: perform an edge detection to identify line segments in the image; evaluate the line segments based on the estimated true horizon to identify one of the line segments that has a higher probability of being the true horizon; and classify the one of the line segments as the true horizon.

Clause 25. The apparatus of clause 24, wherein the apparatus caused to evaluate the line segments includes the apparatus caused to evaluate only those of the line segments that are within a tolerance band around the estimated true horizon.

Clause 26. The apparatus of any of clauses 19 to 25, wherein the image is acquired from an aircraft, the evaluation is performed to verify the expected characteristics that include multiple ones of (a) a relative brightness of the image segments oriented according to an attitude of the aircraft, (b) at least one of roughness or curvature of the line or line segment, (c) an extent of the line or line segment, or (d) a brightness profile of the image along one or more transects that intersect the line or line segment.

Clause 27. The apparatus of any of clauses 19 to 26, wherein the image is acquired from an aircraft, and the apparatus caused to perform the evaluation includes the apparatus caused to: determine a first of the image segments relative to a second of the image segments, the first of the image segments being brighter than the second of the image segments, or having a greater intensity of one or more colors relative to the second of the image segments; determine an expected orientation of the first and the second of the image segments based on an attitude of the aircraft; and evaluate the first and the second of the image segments to verify the expected orientation.

Clause 28. The apparatus of any of clauses 19 to 27, wherein the true horizon is determined from an estimated true horizon that divides the image into two image segments, and the apparatus caused to perform the evaluation includes the apparatus caused to: define a tolerance band around the estimated true horizon; and evaluate the line or line segment within the tolerance band or within a defined number of excursions outside the tolerance band.

Clause 29. The apparatus of clause 28, wherein the apparatus caused to evaluate the line or line segment includes the apparatus caused to: determine at least one of roughness or curvature of the line or line segment within the tolerance band, and based on proximity of the line or line segment to a boundary of the tolerance band; and evaluate the at least one of the roughness or curvature of the line or line segment to verify the at least one of the roughness or curvature is within a defined tolerance.

Clause 30. The apparatus of clause 29, wherein determining the at least one of roughness or curvature of the line or line segment includes determining a rate of change of the proximity of the line or line segment to the boundary of the tolerance band.

Clause 31. The apparatus of any of clauses 28 to 30, wherein the tolerance band extends across the image, and the line or line segment is evaluated to verify that an extent of the line or line segment within the tolerance band is at least a threshold amount of the extent of the tolerance band.

Clause 32. The apparatus of any of clauses 19 to 31, wherein the apparatus caused to perform the evaluation includes the apparatus caused to: define a transect that intersects the line or line segment; determine a brightness profile of the image along the transect; and evaluate the brightness profile to verify the brightness profile has at least a threshold similarity with a defined reference profile.

Clause 33. The apparatus of clause 32, wherein the apparatus caused to define the transect includes the apparatus caused to define transects that intersect the line or line segment, and the apparatus caused to determine the brightness profile includes the apparatus caused to: determine component brightness profiles of the image along respective ones of the transects; and determine the brightness profile from the component brightness profiles.

Clause 34. A method of horizon detection, the method comprising: acquiring an image that depicts a view of an environment; defining a line pattern of lines that divide the image into respective pairs of image segments; searching the lines of the line pattern to identify one of the lines as an estimated true horizon in the image that divides the image into a respective pair of image segments at a boundary of greatest difference in average brightness between the image segments from among the respective pairs of image segments; and determining true horizon in the image from the estimated true horizon.

Clause 35. The method of clause 34, wherein the method further comprises performing an image processing on the image before the lines of the line pattern are searched.

Clause 36. The method of clause 34 or clause 35, wherein the method further comprises performing an iterative search of the image to identify the estimated true horizon, the iterative search performed over line patterns that alternate between linear patterns and rotational patterns, an iteration of the iterative search including: defining the line pattern formed of the lines that are parallel for the linear patterns, and intersecting at a common point of intersection for the rotational patterns; searching the lines of the line pattern to identify the one of the lines; and classifying the one of the lines as a local estimated true horizon for the iteration that is input to a next iteration, or identified as the estimated true horizon when the iteration is a last iteration in the iterative search.

Clause 37. The method of clause 36, wherein the iteration is before the last iteration in the iterative search, and the line classified as the local estimated true horizon for the iteration is input to the next iteration of the iterative search in which the line pattern is defined from and includes the line.

Clause 38. The method of clause 37, wherein the line pattern for the iteration is a linear pattern of parallel lines, and the line classified as the local estimated true horizon for the iteration is input to the next iteration in which the line pattern is a rotational pattern of intersecting lines defined from and including the line, and the common point of intersection centered on the line.

Clause 39. The method of clause 38, wherein a second line classified as the local estimated true horizon for the next iteration is input to a further iteration in which the line pattern is a second linear pattern of parallel lines defined from and including the second line, and the parallel lines of the second linear pattern are set at an angle with respect to the line of the linear pattern.

Clause 40. The method of clause 39, wherein the parallel lines of the linear pattern and the second linear pattern have different densities.

Clause 41. The method of any of clauses 37 to 40, wherein the line pattern for the iteration is a rotational pattern of intersecting lines, and the line classified as the local estimated true horizon for the iteration is input to the next iteration in which the line pattern is a linear pattern of parallel lines defined from and including the line.

Clause 42. The method of clause 41, wherein a second line classified as the local estimated true horizon for the next iteration is input to a further iteration in which the line pattern is a second rotational pattern of intersecting lines defined from and including the second line, and with the common point of intersection centered on the second line.

Clause 43. The method of clause 42, wherein the intersecting lines of the rotational pattern and the second rotational pattern have different densities.

Clause 44. The method of any of clauses 36 to 43, wherein the iteration is the last iteration in the iterative search, and the local estimated true horizon for the last iteration is identified as the estimated true horizon.

Clause 45. The method of any of clauses 34 to 44, wherein determining the true horizon includes identifying the estimated true horizon as the true horizon.

Clause 46. The method of any of clauses 34 to 45, wherein determining the true horizon includes: performing an edge detection to identify line segments in the image; evaluating the line segments based on the estimated true horizon to identify one of the line segments that has a higher probability of being the true horizon; and classifying the one of the line segments or a curve fit to the one of the line segments as the true horizon.

Clause 47. The method of clause 46, wherein evaluating the line segments includes evaluating only those of the line segments that are within a tolerance band around the estimated true horizon.

Clause 48. The method of any of clauses 34 to 47, wherein the method further comprises performing an evaluation of at least one of the estimated true horizon or the true horizon as determined from the estimated true horizon to verify one or more expected characteristics, and wherein an indication of the true horizon is output only when the at least one of the estimated true horizon or the true horizon as determined is verified.

Clause 49. The method of clause 48, wherein the evaluation is performed on the estimated true horizon.

Clause 50. The method of clause 49, wherein the evaluation includes a first evaluation performed on the estimated true horizon, and a second evaluation performed on the true horizon as determined from the estimated true horizon, the second evaluation performed only when the estimated true horizon is verified.

Clause 51. The method of any of clauses 48 to 50, wherein the evaluation is performed on the true horizon as determined from the estimated true horizon.

Clause 52. A method of horizon detection, the method comprising: acquiring an image that depicts a view of an environment; determining true horizon in the image, the true horizon expressed as a line or line segment in the image, the line or line segment dividing the image into image segments; performing an evaluation of the true horizon as determined to verify expected characteristics of the line or line segment, the image segments, and the image; and outputting an indication of the true horizon only when the true horizon is verified.

Clause 53. The method of clause 52, wherein the method further comprises performing an image processing on the image before the true horizon is determined.

Clause 54. The method of clause 52 or clause 53, wherein determining the true horizon includes: performing an edge detection to identify line segments in the image; evaluating the line segments to identify one of the line segments that has a higher probability of being the true horizon; and classifying the one of the line segments or a curve fit to the one of the line segments as the true horizon.

Clause 55. The method of any of clauses 52 to 54, wherein the method further comprises performing an iterative search of the image to identify an estimated true horizon that divides the image into two image segments, and wherein the true horizon is determined from the estimated true horizon.

Clause 56. The method of clause 55, wherein determining the true horizon includes identifying the estimated true horizon as the true horizon.

Clause 57. The method of clause 55 or clause 56, wherein determining the true horizon includes: performing an edge detection to identify line segments in the image; evaluating the line segments based on the estimated true horizon to identify one of the line segments that has a higher probability of being the true horizon; and classifying the one of the line segments as the true horizon.

Clause 58. The method of clause 57, wherein evaluating the line segments includes evaluating only those of the line segments that are within a tolerance band around the estimated true horizon.

Clause 59. The method of any of clauses 52 to 58, wherein the image is acquired from an aircraft, the evaluation is performed to verify the expected characteristics that include multiple ones of (a) a relative brightness of the image segments oriented according to an attitude of the aircraft, (b) at least one of roughness or curvature of the line or line segment, (c) an extent of the line or line segment, or (d) a brightness profile of the image along one or more transects that intersect the line or line segment.

Clause 60. The method of any of clauses 52 to 59, wherein the image is acquired from an aircraft, and performing the evaluation includes: determining a first of the image segments relative to a second of the image segments, the first of the image segments being brighter than the second of the image segments, or having a greater intensity of one or more colors relative to the second of the image segments; determining an expected orientation of the first and the second of the image segments based on an attitude of the aircraft; and evaluating the first and the second of the image segments to verify the expected orientation.

Clause 61. The method of any of clauses 52 to 60, wherein the true horizon is determined from an estimated true horizon that divides the image into two image segments, and performing the evaluation includes: defining a tolerance band around the estimated true horizon; and evaluating the line or line segment within the tolerance band or within a defined number of excursions outside the tolerance band.

Clause 62. The method of clause 61, wherein evaluating the line or line segment includes: determining at least one of roughness or curvature of the line or line segment within the tolerance band, and based on proximity of the line or line segment to a boundary of the tolerance band; and evaluating the at least one of the roughness or curvature of the line or line segment to verify the at least one of the roughness or curvature is within a defined tolerance.

Clause 63. The method of clause 62, wherein determining the at least one of roughness or curvature of the line or line segment includes determining a rate of change of the proximity of the line or line segment to the boundary of the tolerance band.

Clause 64. The method of any of clauses 61 to 63, wherein the tolerance band extends across the image, and the line or line segment is evaluated to verify that an extent of the line or line segment within the tolerance band is at least a threshold amount of the extent of the tolerance band.

Clause 65. The method of any of clauses 52 to 64, wherein performing the evaluation includes: defining a transect that intersects the line or line segment; determining a brightness profile of the image along the transect; and evaluating the brightness profile to verify the brightness profile has at least a threshold similarity with a defined reference profile.

Clause 66. The method of clause 65, wherein defining the transect includes defining transects that intersect the line or line segment, and determining the brightness profile includes: determining component brightness profiles of the image along respective ones of the transects; and determining the brightness profile from the component brightness profiles.

Clause 67. A computer-readable storage medium for horizon detection, the computer-readable storage medium being non-transitory and having computer-readable program code stored therein that, in response to execution by processing circuitry, causes an apparatus to at least: acquire an image that depicts a view of an environment; define a line pattern of lines that divide the image into respective pairs of image segments; search the lines of the line pattern to identify one of the lines as an estimated true horizon in the image that divides the image into a respective pair of image segments at a boundary of greatest difference in average brightness between the image segments from among the respective pairs of image segments; and determine true horizon in the image from the estimated true horizon.

Clause 68. The computer-readable storage medium of clause 67, wherein the computer-readable storage medium has further computer-readable program code stored therein that, in response to execution by the processing circuitry, causes the apparatus to further perform an image processing on the image before the lines of the line pattern are searched.

Clause 69. The computer-readable storage medium of clause 67 or clause 68, wherein the computer-readable storage medium has further computer-readable program code stored therein that, in response to execution by the processing circuitry, causes the apparatus to further perform an iterative search of the image to identify the estimated true horizon, the iterative search performed over line patterns that alternate between linear patterns and rotational patterns, an iteration of the iterative search including: define the line pattern formed of the lines that are parallel for the linear patterns, and intersecting at a common point of intersection for the rotational patterns; search the lines of the line pattern to identify the one of the lines; and classify the one of the lines as a local estimated true horizon for the iteration that is input to a next iteration, or identified as the estimated true horizon when the iteration is a last iteration in the iterative search.

Clause 70. The computer-readable storage medium of clause 69, wherein the iteration is before the last iteration in the iterative search, and the line classified as the local estimated true horizon for the iteration is input to the next iteration of the iterative search in which the line pattern is defined from and includes the line.

Clause 71. The computer-readable storage medium of clause 70, wherein the line pattern for the iteration is a linear pattern of parallel lines, and the line classified as the local estimated true horizon for the iteration is input to the next iteration in which the line pattern is a rotational pattern of intersecting lines defined from and including the line, and the common point of intersection centered on the line.

Clause 72. The computer-readable storage medium of clause 71, wherein a second line classified as the local estimated true horizon for the next iteration is input to a further iteration in which the line pattern is a second linear pattern of parallel lines defined from and including the second line, and the parallel lines of the second linear pattern are set at an angle with respect to the line of the linear pattern.

Clause 73. The computer-readable storage medium of clause 72, wherein the parallel lines of the linear pattern and the second linear pattern have different densities.

Clause 74. The computer-readable storage medium of any of clauses 70 to 73, wherein the line pattern for the iteration is a rotational pattern of intersecting lines, and the line classified as the local estimated true horizon for the iteration is input to the next iteration in which the line pattern is a linear pattern of parallel lines defined from and including the line.

Clause 75. The computer-readable storage medium of clause 74, wherein a second line classified as the local estimated true horizon for the next iteration is input to a further iteration in which the line pattern is a second rotational pattern of intersecting lines defined from and including the second line, and with the common point of intersection centered on the second line.

Clause 76. The computer-readable storage medium of clause 75, wherein the intersecting lines of the rotational pattern and the second rotational pattern have different densities.

Clause 77. The computer-readable storage medium of any of clauses 69 to 76, wherein the iteration is the last iteration in the iterative search, and the local estimated true horizon for the last iteration is identified as the estimated true horizon.

Clause 78. The computer-readable storage medium of any of clauses 67 to 77, wherein the apparatus caused to determine the true horizon includes the apparatus caused to identify the estimated true horizon as the true horizon.

Clause 79. The computer-readable storage medium of any of clauses 67 to 78, wherein the apparatus caused to determine the true horizon includes the apparatus caused to: perform an edge detection to identify line segments in the image; evaluate the line segments based on the estimated true horizon to identify one of the line segments that has a higher probability of being the true horizon; and classify the one of the line segments or a curve fit to the one of the line segments as the true horizon.

Clause 80. The computer-readable storage medium of clause 79, wherein the apparatus caused to evaluate the line segments includes the apparatus caused to evaluate only those of the line segments that are within a tolerance band around the estimated true horizon.

Clause 81. The computer-readable storage medium of any of clauses 67 to 80, wherein the computer-readable storage medium has further computer-readable program code stored therein that, in response to execution by the processing circuitry, causes the apparatus to further perform an evaluation of at least one of the estimated true horizon or the true horizon as determined from the estimated true horizon to verify one or more expected characteristics, and wherein an indication of the true horizon is output only when the at least one of the estimated true horizon or the true horizon as determined is verified.

Clause 82. The computer-readable storage medium of clause 81, wherein the evaluation is performed on the estimated true horizon.

Clause 83. The computer-readable storage medium of clause 82, wherein the evaluation includes a first evaluation performed on the estimated true horizon, and a second evaluation performed on the true horizon as determined from the estimated true horizon, the second evaluation performed only when the estimated true horizon is verified.

Clause 84. The computer-readable storage medium of any of clauses 81 to 83, wherein the evaluation is performed on the true horizon as determined from the estimated true horizon.

Clause 85. A computer-readable storage medium for horizon detection, the computer-readable storage medium being non-transitory and having computer-readable program code stored therein that, in response to execution by processing circuitry, causes an apparatus to at least: acquire an image that depicts a view of an environment; determine true horizon in the image, the true horizon expressed as a line or line segment in the image, the line or line segment dividing the image into image segments; perform an evaluation of the true horizon as determined to verify expected characteristics of the line or line segment, the image segments, and the image; and output an indication of the true horizon only when the true horizon is verified.

Clause 86. The computer-readable storage medium of clause 85, wherein the computer-readable storage medium has further computer-readable program code stored therein that, in response to execution by the processing circuitry, causes the apparatus to further perform an image processing on the image before the true horizon is determined.

Clause 87. The computer-readable storage medium of clause 85 or clause 86, wherein the apparatus caused to determine the true horizon includes the apparatus caused to: perform an edge detection to identify line segments in the image; evaluate the line segments to identify one of the line segments that has a higher probability of being the true horizon; and classify the one of the line segments or a curve fit to the one of the line segments as the true horizon.

Clause 88. The computer-readable storage medium of any of clauses 85 to 87, wherein the computer-readable storage medium has further computer-readable program code stored therein that, in response to execution by the processing circuitry, causes the apparatus to further perform an iterative search of the image to identify an estimated true horizon that divides the image into two image segments, and wherein the true horizon is determined from the estimated true horizon.

Clause 89. The computer-readable storage medium of clause 88, wherein the apparatus caused to determine the true horizon includes the apparatus caused to identify the estimated true horizon as the true horizon.

Clause 90. The computer-readable storage medium of clause 88 or clause 89, wherein the apparatus caused to determine the true horizon includes the apparatus caused to: perform an edge detection to identify line segments in the image; evaluate the line segments based on the estimated true horizon to identify one of the line segments that has a higher probability of being the true horizon; and classify the one of the line segments as the true horizon.

Clause 91. The computer-readable storage medium of clause 90, wherein the apparatus caused to evaluate the line segments includes the apparatus caused to evaluate only those of the line segments that are within a tolerance band around the estimated true horizon.

Clause 92. The computer-readable storage medium of any of clauses 85 to 91, wherein the image is acquired from an aircraft, the evaluation is performed to verify the expected characteristics that include multiple ones of (a) a relative brightness of the image segments oriented according to an attitude of the aircraft, (b) at least one of roughness or curvature of the line or line segment, (c) an extent of the line or line segment, or (d) a brightness profile of the image along one or more transects that intersect the line or line segment.

Clause 93. The computer-readable storage medium of any of clauses 85 to 92, wherein the image is acquired from an aircraft, and the apparatus caused to perform the evaluation includes the apparatus caused to: determine a first of the image segments relative to a second of the image segments, the first of the image segments being brighter than the second of the image segments, or having a greater intensity of one or more colors relative to the second of the image segments; determine an expected orientation of the first and the second of the image segments based on an attitude of the aircraft; and evaluate the first and the second of the image segments to verify the expected orientation.

Clause 94. The computer-readable storage medium of any of clauses 85 to 93, wherein the true horizon is determined from an estimated true horizon that divides the image into two image segments, and the apparatus caused to perform the evaluation includes the apparatus caused to: define a tolerance band around the estimated true horizon; and evaluate the line or line segment within the tolerance band or within a defined number of excursions outside the tolerance band.

Clause 95. The computer-readable storage medium of clause 94, wherein the apparatus caused to evaluate the line or line segment includes the apparatus caused to: determine at least one of roughness or curvature of the line or line segment within the tolerance band, and based on proximity of the line or line segment to a boundary of the tolerance band; and evaluate the at least one of the roughness or curvature of the line or line segment to verify the at least one of the roughness or curvature is within a defined tolerance.

Clause 96. The computer-readable storage medium of clause 95, wherein determining the at least one of roughness or curvature of the line or line segment includes determining a rate of change of the proximity of the line or line segment to the boundary of the tolerance band.

Clause 97. The computer-readable storage medium of any of clauses 94 to 96, wherein the tolerance band extends across the image, and the line or line segment is evaluated to verify that an extent of the line or line segment within the tolerance band is at least a threshold amount of the extent of the tolerance band.

Clause 98. The computer-readable storage medium of any of clauses 85 to 97, wherein the apparatus caused to perform the evaluation includes the apparatus caused to: define a transect that intersects the line or line segment; determine a brightness profile of the image along the transect; and evaluate the brightness profile to verify the brightness profile has at least a threshold similarity with a defined reference profile.

Clause 99. The computer-readable storage medium of clause 98, wherein the apparatus caused to define the transect includes the apparatus caused to define transects that intersect the line or line segment, and the apparatus caused to determine the brightness profile includes the apparatus caused to: determine component brightness profiles of the image along respective ones of the transects; and determine the brightness profile from the component brightness profiles.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system including an apparatus for horizon detection for use by a robot, the system comprising:

- a memory of the apparatus is configured to store computer-readable program code;
- processing circuitry of the apparatus is configured to access the memory, and execute the computer-readable program code to cause the apparatus to at least:
  - define a line pattern of lines that divide an image into respective pairs of image segments;
  - search the lines of the line pattern to identify one of the lines as an estimated true horizon in the image at a boundary of greatest difference in average brightness between the image segments from among the respective pairs of image segments;
  - determine true horizon in the image from the estimated true horizon; and
- at least guide, navigate, or control the robot using the true horizon.

2. The system of claim 1, wherein the processing circuitry is configured to execute the computer-readable program code to cause the apparatus to further perform an iterative search of the image to identify the estimated true horizon, the iterative search performed over line patterns that alternate between linear patterns and rotational patterns, an iteration of the iterative search including:

- define the line pattern formed of the lines that are parallel for the linear patterns, and intersecting at a common point of intersection for the rotational patterns;
- search the lines of the line pattern to identify the one of the lines; and
- classify the one of the lines as a local estimated true horizon for the iteration that is input to a next iteration, or identified as the estimated true horizon when the iteration is a last iteration in the iterative search.

3. The system of claim 2, wherein the iteration is before the last iteration in the iterative search, and the line classified as the local estimated true horizon for the iteration is input to the next iteration of the iterative search in which the line pattern is defined from and includes the line.

4. The system of claim 3, wherein the line pattern for the iteration is a linear pattern of parallel lines, and the line classified as the local estimated true horizon for the iteration is input to the next iteration in which the line pattern is a rotational pattern of intersecting lines defined from and including the line, and the common point of intersection centered on the line.

5. The system of claim 3, wherein the line pattern for the iteration is a rotational pattern of intersecting lines, and the line classified as the local estimated true horizon for the iteration is input to the next iteration in which the line pattern is a linear pattern of parallel lines defined from and including the line.

6. The system of claim 1, wherein the apparatus caused to determine the true horizon includes the apparatus caused to:

- perform an edge detection to identify line segments in the image;
- evaluate the line segments based on the estimated true horizon to identify one of the line segments that has a higher probability of being the true horizon; and
- classify the one of the line segments or a curve fit to the one of the line segments as the true horizon.

7. A system including an apparatus for horizon detection for use by a robot, the system comprising:

- a memory of the apparatus is configured to store computer-readable program code; and
- processing circuitry of the apparatus is configured to access the memory, and execute the computer-readable program code to cause the apparatus to at least:
  - determine true horizon in an image, the true horizon expressed as a line or line segment in the image, the line or line segment dividing the image into image segments;

perform an evaluation of the true horizon as determined to verify expected characteristics of the line or line segment, the image segments, and the image; and output an indication of the true horizon only when the true horizon is verified; and at least guide, navigate, or control the robot using the true horizon.

8. The system of claim 7, wherein the apparatus caused to determine the true horizon includes the apparatus caused to:

perform an edge detection to identify line segments in the image;

evaluate the line segments to identify one of the line segments that has a higher probability of being the true horizon; and classify the one of the line segments or a curve fit to the one of the line segments as the true horizon.

9. The system of claim 7, wherein the processing circuitry is configured to execute the computer-readable program code to cause the apparatus to further perform an iterative search of the image to identify an estimated true horizon that divides the image into two image segments, and wherein the true horizon is determined from the estimated true horizon.

10. The system of claim 7, wherein the image is acquired from an aircraft, the evaluation is performed to verify the expected characteristics that include multiple ones of (a) a relative brightness of the image segments oriented according to an attitude of the aircraft, (b) at least one of roughness or curvature of the line or line segment, (c) an extent of the line or line segment, or (d) a brightness profile of the image along one or more transects that intersect the line or line segment.

11. The system of claim 7, wherein the image is acquired from an aircraft, and the apparatus caused to perform the evaluation includes the apparatus caused to:

determine a first of the image segments relative to a second of the image segments, the first of the image segments being brighter than the second of the image segments, or having a greater intensity of one or more colors relative to the second of the image segments;

determine an expected orientation of the first and the second of the image segments based on an attitude of the aircraft; and evaluate the first and the second of the image segments to verify the expected orientation.

12. The system of claim 7, wherein the true horizon is determined from an estimated true horizon that divides the image into two image segments, and the apparatus caused to perform the evaluation includes the apparatus caused to:

define a tolerance band around the estimated true horizon; and evaluate the line or line segment within the tolerance band or within a defined number of excursions outside the tolerance band.

13. The system of claim 7, wherein the apparatus caused to perform the evaluation includes the apparatus caused to:

define a transect that intersects the line or line segment;

determine a brightness profile of the image along the transect; and evaluate the brightness profile to verify the brightness profile has at least a threshold similarity with a defined reference profile.

14. The system of claim 13, wherein the apparatus caused to define the transect includes the apparatus caused to define transects that intersect the line or line segment, and the apparatus caused to determine the brightness profile includes the apparatus caused to:

determine component brightness profiles of the image along respective ones of the transects; and determine the brightness profile from the component brightness profiles.

15. A computer-readable storage medium for horizon detection, the computer-readable storage medium being non-transitory and having computer-readable program code stored therein that, in response to execution by processing circuitry, causes an apparatus to at least:

determine true horizon in an image, the true horizon expressed as a line or line segment in the image, the line or line segment dividing the image into image segments;

perform an evaluation of the true horizon as determined to verify expected characteristics of the line or line segment, the image segments, and the image; and output an indication of the true horizon only when the true horizon is verified.

16. The computer-readable storage medium of claim 15, wherein the computer-readable program code stored therein, in response to execution by the processing circuitry, causes the apparatus to further perform an image processing on the image before the true horizon is determined.

17. The computer-readable storage medium of claim 16, wherein the apparatus caused to determine the true horizon includes the apparatus caused to:

perform an edge detection to identify line segments in the image;

evaluate the line segments to identify one of the line segments that has a higher probability of being the true horizon; and classify the one of the line segments or a curve fit to the one of the line segments as the true horizon.

18. The computer-readable storage medium of claim 17, wherein the computer-readable program code stored therein, in response to execution by the processing circuitry, causes the apparatus to further perform an iterative search of the image to identify an estimated true horizon that divides the image into two image segments, and wherein the true horizon is determined from the estimated true horizon.

19. The computer-readable storage medium of claim 18, wherein the apparatus caused to determine the true horizon includes the apparatus caused to identify the estimated true horizon as the true horizon.

20. The computer-readable storage medium of claim 18, wherein the apparatus caused to determine the true horizon includes the apparatus caused to:

perform an edge detection to identify line segments in the image;

evaluate the line segments based on the estimated true horizon to identify one of the line segments that has a higher probability of being the true horizon; and classify the one of the line segments as the true horizon.

* * * * *